United States Patent
Inui et al.

(10) Patent No.: US 9,986,530 B2
(45) Date of Patent: May 29, 2018

(54) RADIO WAVE MANAGEMENT METHOD, RADIO WAVE MANAGEMENT APPARATUS, AND RECORDING MEDIUM

(71) Applicant: FUJITSU LIMITED, Kawasaki-shi, Kanagawa (JP)

(72) Inventors: Motonori Inui, Kawasaki (JP); Motoshi Hamasaki, Kawasaki (JP); Masahiro Yoshimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/622,693

(22) Filed: Jun. 14, 2017

(65) Prior Publication Data

US 2018/0014272 A1    Jan. 11, 2018

(30) Foreign Application Priority Data

Jul. 7, 2016 (JP) ................. 2016-135224

(51) Int. Cl.
| | |
|---|---|
| *H04W 24/00* | (2009.01) |
| *H04W 64/00* | (2009.01) |
| *H04W 4/02* | (2018.01) |
| *H04M 1/725* | (2006.01) |

(52) U.S. Cl.
CPC ..... *H04W 64/006* (2013.01); *H04M 1/72572* (2013.01); *H04W 4/023* (2013.01)

(58) Field of Classification Search
CPC .............. H04W 64/006; H04W 24/08
See application file for complete search history.

(56) References Cited

U.S. PATENT DOCUMENTS

| | | | | |
|---|---|---|---|---|
| 2015/0017924 A1* | 1/2015 | Worrall | ................. | H04W 48/16 455/67.11 |
| 2016/0112149 A1* | 4/2016 | Kim | .................... | H04B 17/309 370/252 |
| 2017/0272964 A1* | 9/2017 | Shatil | .................... | H04W 24/08 |
| 2017/0280504 A1* | 9/2017 | De Pasquale | ......... | H04W 84/04 |

FOREIGN PATENT DOCUMENTS

| | | |
|---|---|---|
| JP | 2007-088569 A | 4/2007 |
| JP | 2008-271141 A | 11/2008 |
| JP | 2011-191871 A | 9/2011 |
| JP | 2014-143527 A | 8/2014 |

* cited by examiner

*Primary Examiner* — Justin Lee
(74) *Attorney, Agent, or Firm* — Arent Fox LLP

(57) ABSTRACT

A radio wave management method executed by a processor included in a radio wave management apparatus, the radio wave management method includes counting the number of first mobile terminals which exist in a first area corresponding to a measurement target of a radio wave situation; requesting second mobile terminals, which exist in a second area that is different from the first area, to move to the first area when the number of first mobile terminals is smaller than the predetermined number; requesting the first mobile terminals and the second mobile terminals to measure the radio wave situation when the second mobile terminals move to the first area; receiving the radio wave situation from the first mobile terminals and the second mobile terminals; and transmitting the received radio wave situation to a computer in response to a request from the computer which is coupled to the radio wave management apparatus.

14 Claims, 23 Drawing Sheets

FIG. 3

| REQUISITE NUMBER | MEASUREMENT AREA | NUMBER OF TERMINALS | START TIME | END TIME | AUXILIARY MEASUREMENT AREA |
|---|---|---|---|---|---|
| 1 | A | EQUAL TO OR LARGER THAN G | AM10:00 | AM11:00 | A1 |
| 2 | B | EQUAL TO OR LARGER THAN 10 | FM10:00 | FM11:00 | B1 |
| 3 | C | EQUAL TO OR LARGER THAN 1000 | FM7:00 | FM9:00 | C1 |
| 4 | D | EQUAL TO OR LARGER THAN 400 | ... | ... | D1 |

FIG. 4

| TERMINAL ID | PRESENT PLACE INFORMATION | TIME |
|---|---|---|
| 1 | AREA A | 18:05 |
| 2 | AREA A | 18:00 |
| 3 | AREA A1 | 18:00 |
| 8 | AREA B | 17:50 |
| 9 | ... | ... |
|  | ... | ... |

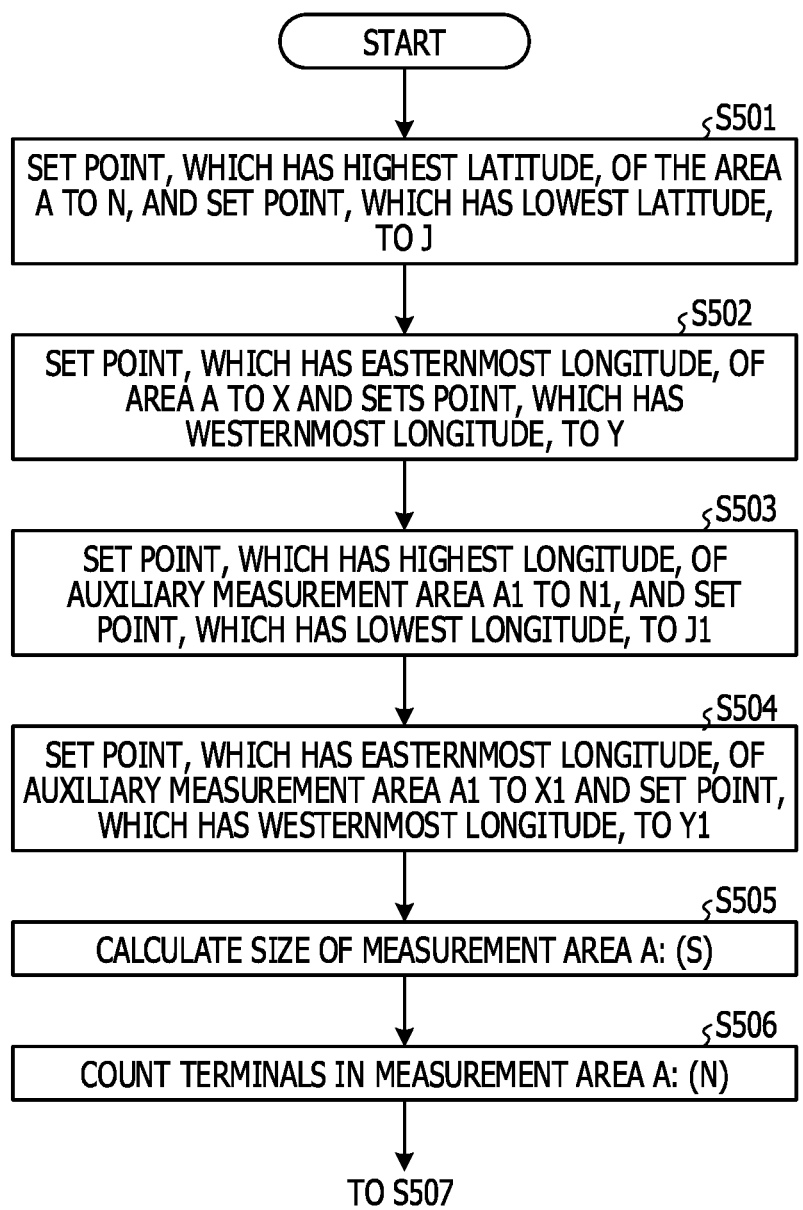

FIG. 13

| RATIO (%) OF NUMBER OF TERMINALS IN MEASUREMENT AREA TO REQUISITE NUMBER | EXTENSION RANGE (m OR km) |
|---|---|
| 0%~9% | A |
| 10%~19% | B |
| 20%~29% | C |
| 30%~39% | D |
| ... | ... |
| 90%~99% | X |

FIG. 14

| DENSITY IN MEASUREMENT AREA (NUMBER OF TERMINALS/km$^2$ OR m$^2$) | REDUCTION RANGE (m OR km) |
|---|---|
| M1 < M ≦ M2 | a |
| M2 < M ≦ M3 | b |
| M3 < M ≦ M4 | c |
| M4 < M ≦ M5 | d |
| ... | ... |
|  |  |

FIG. 15
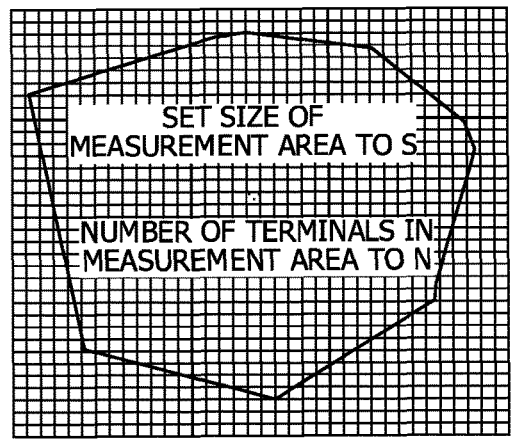
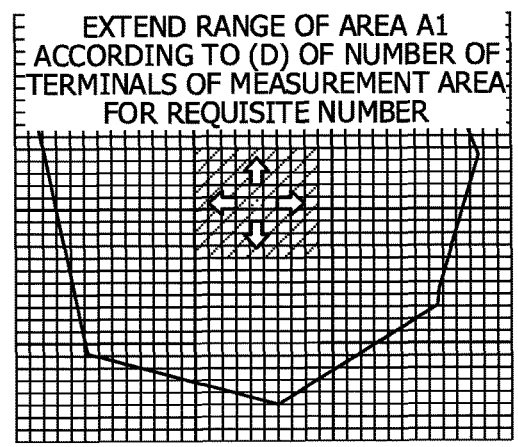
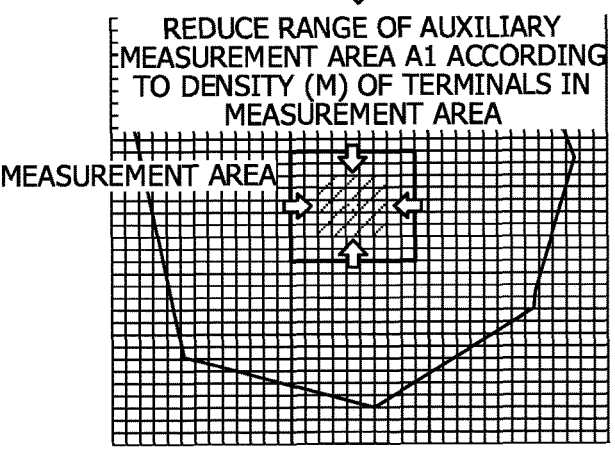

FIG. 17

| AUXILIARY AREA ID | NUMBER IN AREA | DISTANCE FROM MEASUREMENT AREA |
|---|---|---|
| A2 | N1 TERMINALS | O1km |
| A3 | N2 TERMINALS | O2km |
| A4 | N3 TERMINALS | O3km |
| A5 | Nx TERMINALS | ... |
| ... | ... | ... |

FIG. 18

| AUXILIARY AREA ID | PRIORITY INDEX | PRIORITY ORDER |
|---|---|---|
| A4 | K1 | 1 |
| A2 | K2 | 2 |
| A3 | K3 | 3 |
| ... | ... | ... |

FIG. 19

| RANGE OF Q | PRIORITY ORDER |
|---|---|
| $Qa \leqq Q < Qb$ | 1 |
| $Qb \leqq Q < Qc$ | 2 |
| $Qc \leqq Q < Qe$ | 3 |
| ... | ... |
|  |  |
|  |  |

RADIO WAVE MANAGEMENT METHOD, RADIO WAVE MANAGEMENT APPARATUS, AND RECORDING MEDIUM

CROSS-REFERENCE TO RELATED APPLICATION

This application is based upon and claims the benefit of priority of the prior Japanese Patent Application No. 2016-135224, filed on Jul. 7, 2016, the entire contents of which are incorporated herein by reference.

FIELD

The embodiments discussed herein are related to a radio wave management method, a radio wave management apparatus, and a recording medium.

BACKGROUND

In recent years, a communication carrier grasps a radio wave situation of a communication area using a portable terminal of a user in order to improve radio waves. For example, the user installs an application which requests to improve the radio waves in the portable terminal. Furthermore, in a case where the portable terminal receives an instruction in an area, in which the radio waves are demanded to be improved, from the user, the portable terminal measures the radio wave situation of a location in which the instruction is received. Furthermore, the portable terminal transmits radio wave information, which includes a measurement result and location information, to a management server using the application. In this manner, the radio wave information, which is laminated in the management server, is utilized in order to improve radio wave qualities. For example, Japanese Laid-open Patent Publication No. 2008-271141, Japanese Laid-open Patent Publication No. 2007-88569, Japanese Laid-open Patent Publication No. 2014-143527, Japanese Laid-open Patent Publication No. 2011-191871, and the like are disclosed as the related art.

However, in the technologies, deviation is generated on the radio wave information collected from the user, and it is difficult to collect the radio wave information demanded by the communication carrier.

For example, the communication carrier wants to collect the radio wave information for a plurality of conditions, such as different time bands and different environment, even in the same area. However, in the technologies, large pieces of radio wave information exist in an urban area which has a large population and small pieces of radio wave information exist in a suburb. In the technologies, the user takes the lead in measurement of the radio wave situation, and thus the radio wave situation may not be measured under a condition demanded by the communication carrier.

It is conceivable that a worker of the communication carrier visits a field and measures the radio wave situation under the condition demanded by the communication carrier. However, the number of works and huge costs, such as and movement costs, are demanded, and thus it is not realistic.

An aspect of the disclosure provides a radio wave management method, a radio wave management apparatus, and a non-transitory computer-readable recording medium which are capable of collecting radio wave information demanded by the communication carrier.

SUMMARY

According to an aspect of the invention, a radio wave management method executed by a processor included in a radio wave management apparatus, the radio wave management method includes counting the number of first mobile terminals which exist in a first area corresponding to a measurement target of a radio wave situation; requesting second mobile terminals, which exist in a second area that is different from the first area, to move to the first area when the number of first mobile terminals is smaller than the predetermined number; requesting the first mobile terminals and the second mobile terminals to measure the radio wave situation when the second mobile terminals move to the first area; receiving the radio wave situation from the first mobile terminals and the second mobile terminals; and transmitting the received radio wave situation to a computer in response to a request from the computer which is coupled to the radio wave management apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a table illustrating an example of information stored in a requisite management DB;

FIG. 4 is a table illustrating an example of information stored in a terminal management DB;

FIGS. 12A and 12B are flowcharts illustrating a flow of an auxiliary measurement area determination process;

FIG. 13 is a table illustrating an example of information stored in an extension range DB;

FIG. 14 is a table illustrating an example of information stored in a reduction range DB;

FIG. 15 is a diagram illustrating extension and reduction of the auxiliary measurement area;

FIG. 17 is a table illustrating an example of information stored in an auxiliary area management DB;

FIG. 18 is a table illustrating an example of information stored in an auxiliary area candidate DB;

FIG. 19 is a table illustrating an example of information stored in an auxiliary area determination reference DB;

DESCRIPTION OF EMBODIMENTS

Hereinafter, examples of a radio wave management apparatus, a radio wave management method, and a radio wave management program disclosed in the present application will be described in detail with reference to the accompanying drawings. The embodiments are not limited by the examples. It is possible to appropriately combine the respective examples in a consistent range.

First Embodiment

Figure 1:
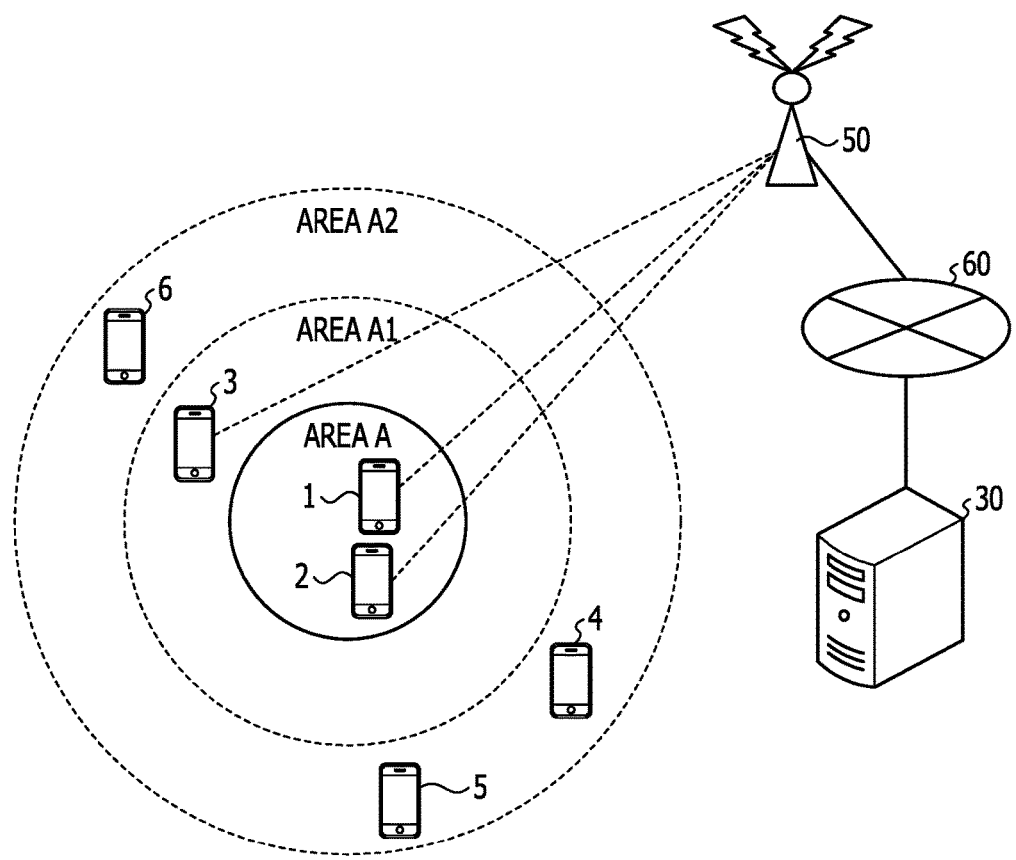
FIG. 1 is a diagram illustrating a whole configuration of a radio wave measurement system according to first embodiment.

FIG. 1 is a diagram illustrating a whole configuration of a radio wave measurement system according to first embodiment. As illustrated in FIG. 1, the radio wave measurement system is a system which includes a plurality of mobile terminals 1 to 6, a base station 50, and a radio wave measurement server 30. The radio wave measurement system manages a radio wave situation, which is measured by each of the mobile terminals, of an area using the radio wave measurement server 30.

Each of the mobile terminals is a terminal which is capable of performing wireless communication with another apparatus through the base station 50 or the like. Each of the mobile terminals is, for example, a smart phone, a mobile phone, or the like. In each of the mobile terminals, a radio wave measurement application is installed which measures radio wave information of an existing area and transmits a measurement result to the radio wave measurement server 30 together with a measurement location. In communication performed by the radio wave measurement application, an identifier of the mobile terminal is included. Therefore, the radio wave measurement server 30 is capable of identifying each of the mobile terminals, and is capable of performing communication by designating each of the mobile terminals.

The mobile terminal 1 and the mobile terminal 2 exist in an area A. The mobile terminal 3 exists in an area A1, which includes the area A or which is adjacent to the area A, and exists in an area of the area A1 outside the area A. The mobile terminals 4 to 6 exist in an area A2, which includes the area A and the area A1 or which is adjacent to the area A1, and exists in an area, which is not included in the area A and area A1, of the area A2. Each of the areas may be managed by the same base station.

The base station 50 is an apparatus of a mobile phone network which directly communicates with each of the mobile terminals. The base station 50 has the same functional configuration as a general base station apparatus. The base station 50 is coupled to the radio wave measurement server 30 through a network 60. It is possible to use various networks for the network 60 regardless of a wired or wireless network, a dedicated line, Internet, or the like.

The radio wave measurement server 30 is an example of a server apparatus which requests a mobile terminal exiting in a radio wave measurement target area to measure a radio wave situation in the area, and collects and manages the measurement result. Specifically, the radio wave measurement server 30 counts the number of first mobile terminals which exist in a first area that is a radio wave situation collection target. Furthermore, in a case where the number of first mobile terminals is equal to or larger than a predetermined number, the radio wave measurement server 30 requests the first mobile terminals to measure the radio wave situation. In contrast, in a case where the number of first mobile terminals is smaller than the predetermined number, the radio wave measurement server 30 transmits a request to move to the first area to second mobile terminals which exist in a second area that is adjacent to the first area or that includes the first area. Thereafter, the radio wave measurement server 30 requests the mobile terminals, which exist in the first area, to measure the radio wave situation.

For example, the radio wave measurement server 30 specifies that the number of mobile terminals, which exist in the area A of the radio wave measurement target, is two, that is, the mobile terminal 1 and the mobile terminal 2 using wireless communication with the base station 50 or communication such as the Internet. Furthermore, in a case where the measured number (two) is smaller than a threshold (for example, three), the radio wave measurement server 30 detects the mobile terminal 3 which exists in the area A1 that includes the area A, that is, the area A1 that indicates a wider area than the area A. Subsequently, the radio wave measurement server 30 requests the mobile terminal 3 to move to the area A.

Thereafter, in a case where the mobile terminal 3 moves from the area A1 to the area A, the radio wave measurement server 30 requests the respective mobile terminals 1, 2, and 3 which exist in the area A to measure the radio wave situation. Furthermore, the radio wave measurement server 30 receives the radio wave situation of the area A from each of the mobile terminals 1, 2, and 3, and stores the received radio wave situation in a storage unit or the like. Thereafter, the radio wave measurement server 30 provides the radio wave situation of each area, which is stored in the storage unit or the like, according to a demand from a communication carrier. The communication carrier improves radio waves based on information of the radio wave situation which is provided from the radio wave measurement server 30.

As described above, in a case where the number of mobile terminals which exist in the target area is smaller than the threshold, the radio wave measurement server 30 induces a mobile terminal, which exists in an adjacent area that is adjacent to the target area, to move to the target area. Therefore, the radio wave measurement server 30 is capable of collecting radio wave information demanded by the communication carrier.

Figure 2:
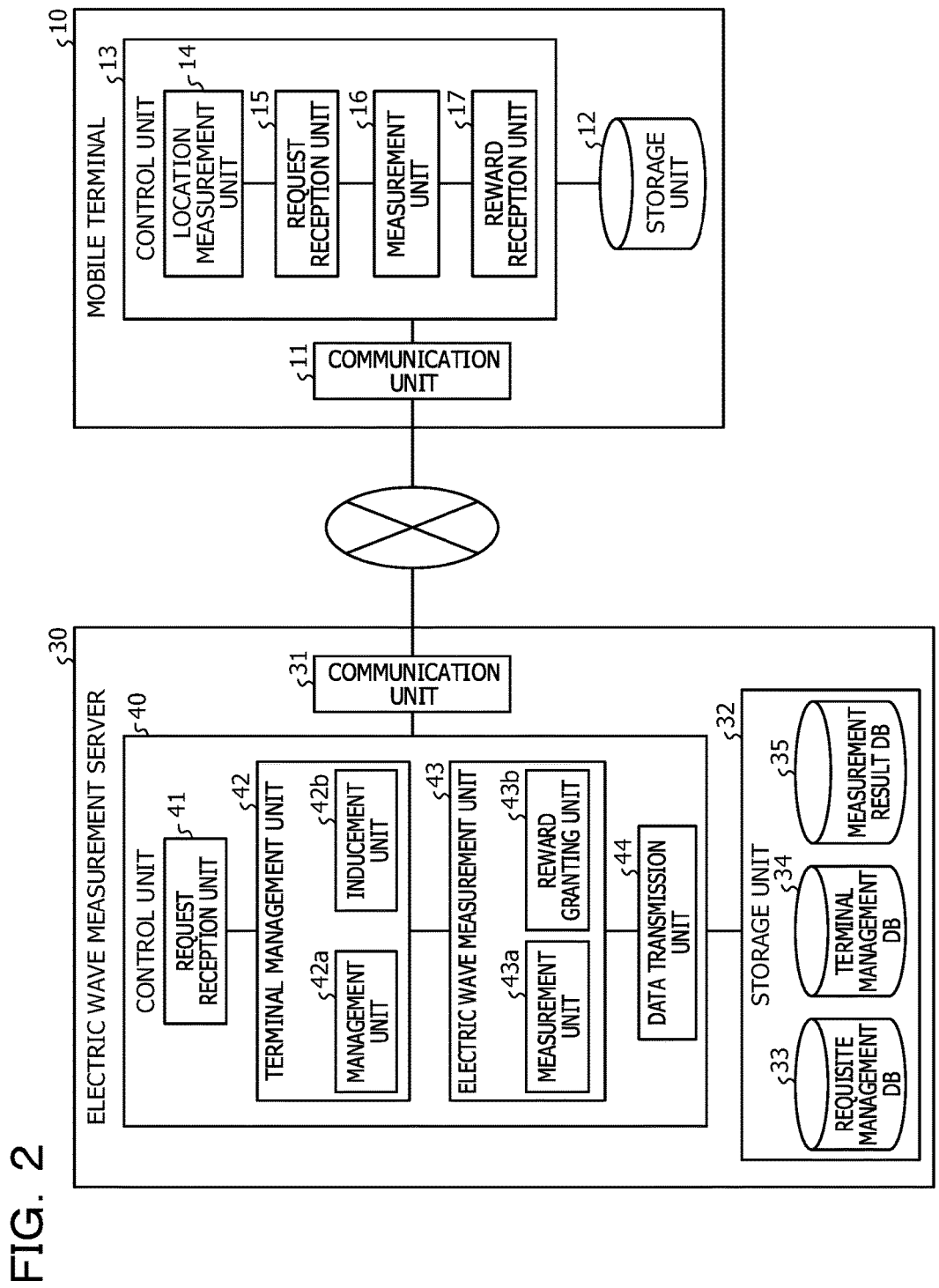
FIG. 2 is a functional block diagram illustrating a functional configuration of the radio wave measurement system according to first embodiment.

Subsequently, a functional configuration of the respective apparatuses illustrated in FIG. 1 will be described. FIG. 2 is a functional block diagram illustrating the functional configuration of the radio wave measurement system according to first embodiment. Since the base station 50 has the same configuration as a general base station, the detailed description thereof is omitted. Since each of the mobile terminals has the same configuration, here, a mobile terminal 10 will be described.

As illustrated in FIG. 2, the radio wave measurement server 30 includes a communication unit 31, a storage unit 32, and a control unit 40. The storage unit 32 is an example of a storage device such as a memory or hard disk. The control unit 40 is an example of an electronic circuit such as a processor.

The communication unit 31 is a processing unit which controls communication with another apparatus using wired or wireless manner. For example, the communication unit 31 receives the measurement result, which includes a radio wave situation and location information, from each of the mobile terminals. The communication unit 31 transmits a terminal inducement trigger, which prompts inducement from an area outside the radio wave measurement target to the radio wave measurement target area, and a radio wave measurement trigger that requests radio wave measurement to relevant mobile terminals. The communication unit 31 transmits a reward for the radio wave measurement.

The storage unit 32 stores a program performed by the control unit 40, data, and the like. The storage unit 32 stores various databases such as a requisite management DB 33, a terminal management DB 34, and a measurement result DB 35.

The requisite management DB 33 is a database which stores information relevant to each area. Specifically, the requisite management DB 33 stores a requisite of the radio wave measurement and an auxiliary area, which is a transmission destination of the inducement trigger, for each of the areas corresponding to the radio wave measurement target. FIG. 3 is a table illustrating an example of information stored in the requisite management DB 33. As illustrated in FIG. 3, the requisite management DB 33 stores "a requisite number, a measurement area, the number of terminals, start time, end time, and an auxiliary measurement area" through association.

The "requisite number" stored here is an identification number which identifies the measurement requisite. The "measurement area" is information which specifies an area of the radio wave measurement target. It is possible to indicate a range of the "measurement area" using, for example, the latitude and the longitude, and it is possible to manage the "measurement area" using an identifier of an area which is managed by the communication carrier. The "number of terminals" is a requisite number of mobile terminals which become a measurement condition. The "start time" is measurement start hour. The "end time" is the measurement end time. The "auxiliary measurement area" indicates an area on which inducement to the measurement area is performed. The "auxiliary measurement area" is managed using the latitude and the longitude, an identifier of the area, or the like, similarly to the measurement area.

For example, a requisite number "1" of FIG. 3 is set such that the radio wave measurement starts at "AM 10:00" for a measurement area "A" and the radio wave measurement ends at "AM 11:00". The measurement requisite is set such that the measurement starts in a case where the number of terminals in the measurement area "A" is equal to or larger than "G" and a terminal inducement trigger is transmitted to mobile terminals which exist in an auxiliary measurement area "A1" in a case where the number of terminals does not satisfy the requisite.

The terminal management DB 34 is a database which manages a location of each of the mobile terminals. Specifically, the terminal management DB 34 stores the location information of each of the mobile terminals by regularly receiving the location information from each of the mobile terminals or receiving the location information from each of the mobile terminals in a case of measurement start time.

FIG. 4 is a table illustrating an example of information stored in the terminal management DB 34. As illustrated in FIG. 4, the terminal management DB 34 stores a "terminal ID, present place information, and time" through association. The "terminal ID" stored here is an identifier which identifies a mobile terminal. The "present place information" indicates present location information of the mobile terminal. The "time" is time at which the location information is measured. The example of FIG. 4 indicates that a mobile terminal 1, which has a terminal ID "1", exists in the "area A" at "18:05".

The measurement result DB 35 is a database which stores a measurement result of the radio wave measurement. Specifically, the measurement result DB 35 stores a measurement result acquired by associating an area (location information) with a radio wave situation.

The control unit 40 is a processing unit which manages the whole process of the radio wave measurement server 30. The control unit 40 transmits and receives various information using the radio wave measurement application which is installed in each of the mobile terminals. The control unit 40 includes a request reception unit 41, a terminal management unit 42, a radio wave measurement unit 43, and a data transmission unit 44. The request reception unit 41, the terminal management unit 42, the radio wave measurement unit 43, and the data transmission unit 44 are examples of an electronic circuit, such as a processor, or examples of a process which is performed by the processor.

The request reception unit 41 is a processing unit which receives a radio wave measurement requisite from a manager or the like and stores the radio wave measurement requisite in the requisite management DB 33. For example, inputs of "the measurement area, the number of terminals, the start time, the end time, and the auxiliary measurement area" are received, the request reception unit 41 assigns "requisite numbers" thereto and stores the inputs in the requisite management DB 33.

The terminal management unit 42 is a processing unit that manages a present place or the like of each of the mobile terminals. The terminal management unit 42 includes a management unit 42a and an inducement unit 42b.

The management unit 42a is a processing unit which acquires present place information of each of the mobile terminals from each of the mobile terminals, and stores the acquired present place information in the terminal management DB 34. For example, the management unit 42a acquires the location information (present place information) from each of the mobile terminals, which are capable of performing communication, regularly or in a case where a measurement requisite corresponding to any requisite number reaches the start time. The terminal management unit 42 is capable of transmitting a request to transmit the location information to a relevant mobile terminal and acquiring the location information from each of the mobile terminals. The terminal management unit 42 is also capable of receiving the location information which is actively transmitted by each of the mobile terminals.

The inducement unit 42b is a processing unit which starts the radio wave measurement or performs inducement to the area. Specifically, in a case where a radio wave measurement area, which reaches the start time, exists, the inducement unit 42b counts the number of mobile terminals, which exist in the area, with reference to the requisite management DB 33. Furthermore, in a case where the number of mobile terminals, which exist in the radio wave measurement area, satisfies the measurement requisite, the inducement unit 42b requests the radio wave measurement unit 43 to start radio wave measurement of the radio wave measurement area. In contrast, in a case where the number of mobile terminals, which exist in the radio wave measurement area, does not satisfy the measurement requisite, the inducement unit 42b transmits the terminal inducement trigger to the mobile terminals in the auxiliary measurement area, and induces movement to the area. After prescribed time elapses from the inducement, the inducement unit 42b counts the number of mobile terminals, which exist in the radio wave measurement area, and performs the same process.

For example, in a case of being reached the start time "AM 10:00" of the area A, the inducement unit 42*b* counts the number of mobile terminals which have the area A as the present place information with reference to the terminal management DB 34. Furthermore, in a case where the number of relevant mobile terminals is 10 and is equal to or larger than the number of terminals "G" which is stored in the requisite management DB 33, the inducement unit 42*b* requests the radio wave measurement unit 43 to start the radio wave measurement of the area A.

In contrast, in a case where the number of relevant mobile terminals is 5 and is smaller than the number of terminals "G" which is stored in the requisite management DB 33, the inducement unit 42*b* specifies the auxiliary measurement area A1 of the measurement area A with reference to the requisite management DB 33. Subsequently, the inducement unit 42*b* specifies the mobile terminals which exist in the auxiliary measurement area A1 with reference to the terminal management DB 34. Furthermore, the inducement unit 42*b* transmits an inducement screen to the area A to mobile terminals which exist in an area in the auxiliary measurement area A1 except the area A. After prescribed time elapses from the transmission of the inducement screen, the inducement unit 42*b* counts the number of mobile terminals in the area A again. In a case where the number of terminals is equal to or larger than "G", the inducement unit 42*b* starts the radio wave measurement. In contrast, in a case where the number of terminals is smaller than "G", the inducement unit 42*b* transmits the inducement screen again to the mobile terminals which exist in the area A1.

Figure 5:
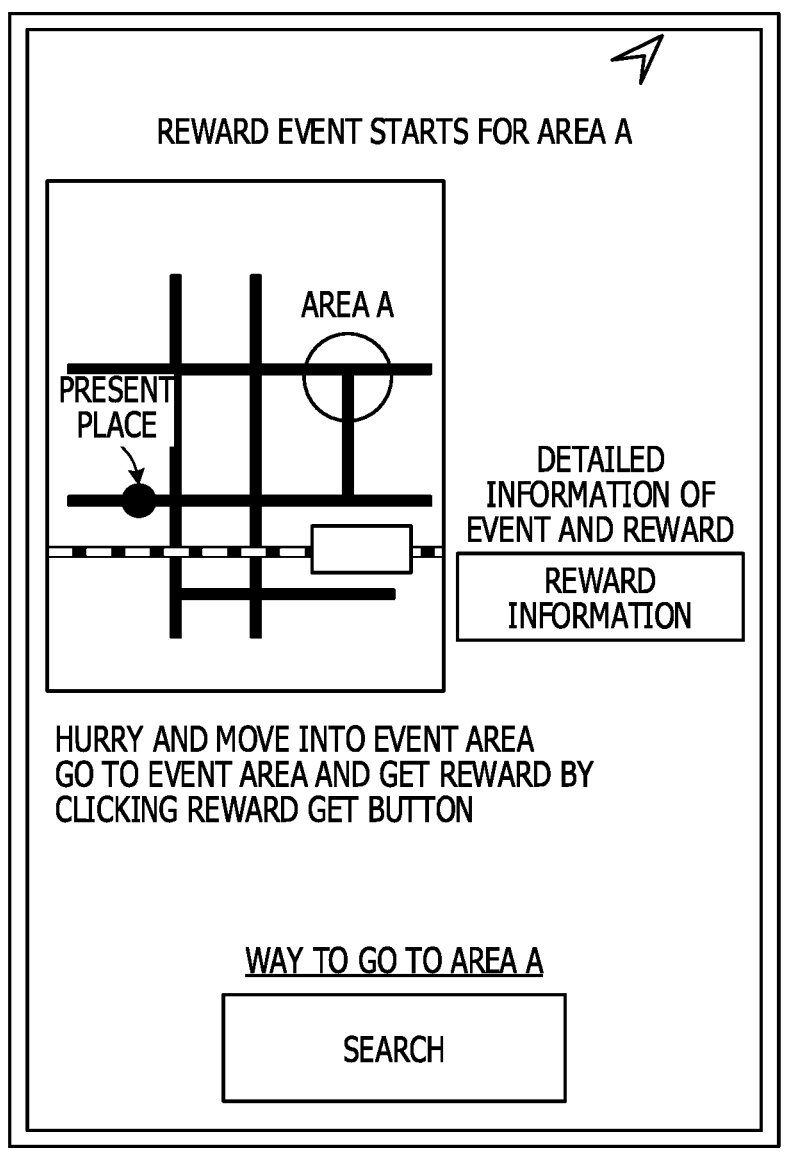
FIG. 5 is a diagram illustrating an example of a terminal inducement request screen.

Here, a terminal inducement trigger screen will be described. FIG. 5 is a diagram illustrating an example of a terminal inducement request screen. As illustrated in FIG. 5, an inducement screen generated by the inducement unit 42*b* includes a message which notifies a reward event according to movement, map information which indicates the area A that is an inducement destination, a "reward information" button which is used to read event content or reward content, a "search" button which is used to read a way to go to the area A. As described above, the inducement unit 42*b* is capable of prompting inducement to another area by generating and transmitting a screen on which the map and the reward content are displayed.

The radio wave measurement unit 43 is a processing unit which measures the radio wave situation of the area. The radio wave measurement unit 43 includes a measurement unit 43*a* and a reward granting unit 43*b*.

The measurement unit 43*a* is a processing unit which requests the mobile terminals in the area to measure the radio wave situation and receives the measurement result. Specifically, in a case where the inducement unit 42*b* requests to start the radio wave measurement, the measurement unit 43*a* transmits the radio wave measurement trigger, which includes a radio wave situation measurement instruction and a measurement result transmission instruction, to each of the mobile terminals which exist in the requested area.

For example, in a case where it is instructed to start the radio wave measurement of the area A, the measurement unit 43*a* specifies the mobile terminals, which exist in the area A, with reference to the measurement result DB 35. Furthermore, the measurement unit 43*a* transmits the radio wave measurement trigger to each of the mobile terminals in the area A. Thereafter, the measurement unit 43*a* receives the measurement result, which includes the radio wave situation and the location information, from each of the mobile terminals in the area A. Furthermore, the measurement unit 43*a* notifies the reward granting unit 43*b* of the received measurement result and stores the received measurement result in the measurement result DB 35.

In a case where radio wave situation measurement data is damaged, the measurement unit 43*a* destroys the measurement result which includes data having excessively small measurement value. Furthermore, the measurement unit 43*a* stores only measurement result, which includes non-broken measurement data, in the measurement result DB 35. At this time, measurement unit 43*a* is capable of transmitting a retransmission request, a remeasurement request, or the like to a transmission source of damaged measurement data.

In a case where the measurement result, which is stored in the measurement result DB 35, does not satisfy the measurement requisite, the measurement unit 43*a* transmits the radio wave measurement trigger again. For example, in a case where the measurement result of the area A is smaller than "G", the measurement unit 43*a* transmits the radio wave measurement trigger to each of the mobile terminals of the area A. At this time, in a case of communication which is capable of designating a terminal, the measurement unit 43*a* is capable of designating a mobile terminal, which has a failed measurement result, and transmitting the radio wave measurement trigger. The measurement unit 43*a* is capable of requesting the inducement unit 42*b* to perform an inducement process again.

Figure 6:
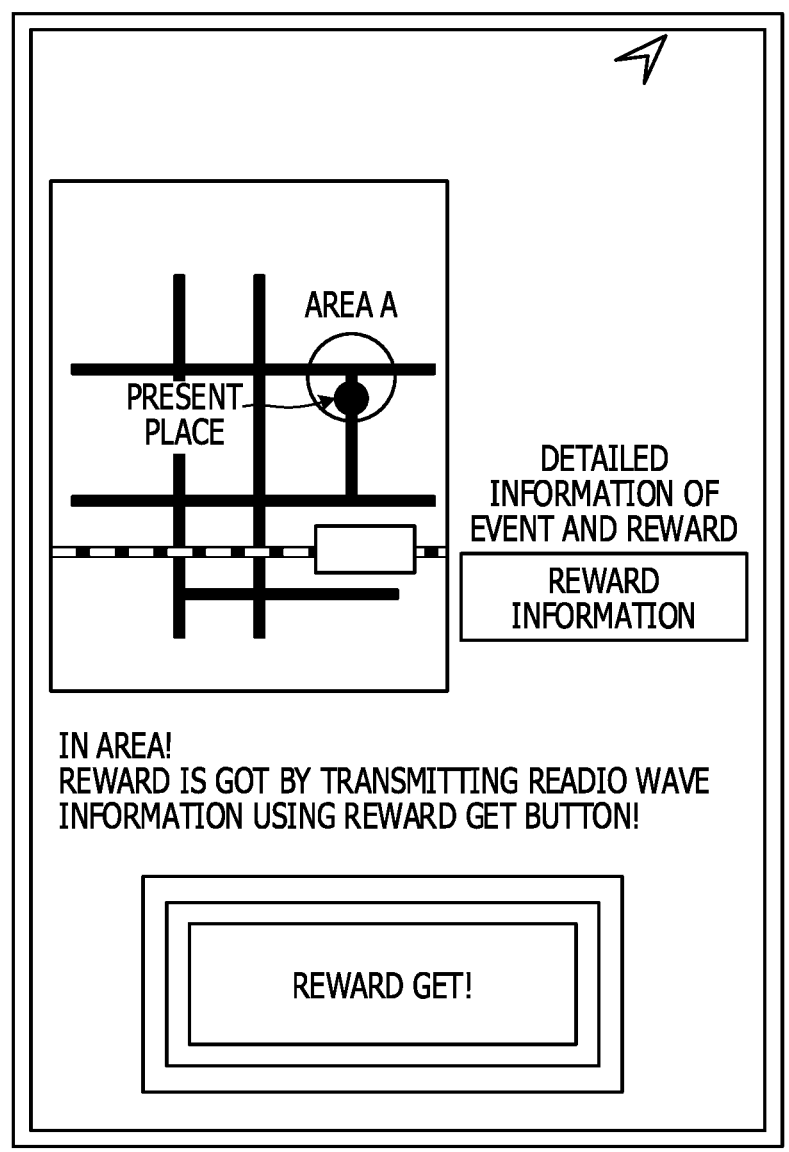
FIG. 6 is a diagram illustrating an example of a radio wave measurement request screen.

Here, a radio wave measurement trigger screen will be described. FIG. 6 is a diagram illustrating an example of a radio wave measurement request screen. As illustrated in FIG. 6, a request screen generated by the measurement unit 43*a* includes a message which indicates that a reward event is generated in the area A, map information which indicates the area A, a "reward information" button which is used to read event content and reward content, a "reward GET!" button which is used to perform the radio wave measurement and to transmit the measurement result, which includes the measured radio wave situation and the location information, to the radio wave measurement server 30, or the like. As described above, the measurement unit 43*a* is capable of prompting to measure the radio wave situation by generating and transmitting a screen on which the map and the reward content are displayed.

The reward granting unit 43*b* is a processing unit which grants a reward, which is set in advance, to a mobile terminal which measures the radio wave situation. Specifically, in a case where end of the measurement is notified by the measurement unit 43*a*, the reward granting unit 43*b* specifies a mobile terminal, which transmits the measurement result, with reference to the measurement result DB 35. Furthermore, the reward granting unit 43*b* grants a reward to the specified mobile terminal.

For example, in a case where the radio wave measurement of the area A ends, the reward granting unit 43*b* is capable of transmitting a reward to only a mobile terminal which normally transmits the measurement result including the radio wave situation of the area A. The reward granting unit 43*b* is also capable of granting a reward corresponding to 50% to a mobile terminal in which the measurement data is damaged. The reward granting unit 43*b* is also capable of transmitting a more excellent reward to a mobile terminal, which moves from the area A1 to the area A and properly transmits the measurement result, rather than mobile terminals which exist in the area A from the beginning.

Here, it is possible to use various incentives, such as, a point of a communication carrier, reduction of the amount of communication, and a rare item of a game application, for the reward. As a method of granting a reward, it is possible to use a method of granting a reward on a game by being cooperated with the game. Otherwise, it is possible to notify a user of a uniform resource locator (URL) or the like, and to grant a point in a case where the user accesses the URL.

In the example, the example is described in which the radio wave measurement server 30 communicates with the mobile terminal through the radio wave measurement application. However, the embodiment is not limited thereto. For example, it is possible to perform communication through a base station. For example, it is possible for the inducement unit 42b to transmit the inducement screen to the mobile terminals, which exist in the area A1, to move to the to the area A through a base station which manages the auxiliary measurement area A1 of the measurement area A.

Returning to FIG. 2, the data transmission unit 44 is a processing unit which provides a measurement result to the carrier. Specifically, the data transmission unit 44 reads a measurement result of an area, which is requested by the communication carrier, from the measurement result DB 35, and transmits the measurement result to the communication carrier.

As illustrated in FIG. 2, the mobile terminal 10 includes a communication unit 11, a storage unit 12, and a control unit 13. The storage unit 12 is an example of a storage device such as a memory or a hard disk. The control unit 13 is an example of an electronic circuit such as a processor.

The communication unit 11 is a processing unit which controls communication of another apparatus in wired or wireless manner. For example, the communication unit 11 receives the terminal inducement trigger and the radio wave measurement trigger from the radio wave measurement server 30. The communication unit 11 transmits the location information to the radio wave measurement server 30, and transmits the measurement result, which includes the radio wave situation and the location information, to the radio wave measurement server 30.

The storage unit 12 stores a program executed by the control unit 13, data, and the like. The storage unit 12 stores the measured location information, the measured radio wave situation, and the like.

The control unit 13 is a processing unit which manages a whole process of the mobile terminal 10, and executes the radio wave measurement application. Specifically, the control unit 13 includes a location measurement unit 14, a request reception unit 15, a measurement unit 16, and a reward reception unit 17 as examples of the processing unit included in the radio wave measurement application. The location measurement unit 14, the request reception unit 15, the measurement unit 16, and the reward reception unit 17 are examples of, for example, an electronic circuit, such as a processor, or examples of a process which is performed by the processor.

The location measurement unit 14 is a processing unit which measures the location information of the mobile terminal 10 and transmits the location information as the measurement to the radio wave measurement server 30. Specifically, the location measurement unit 14 measures a present location of the mobile terminal 10 using a global positioning system (GPS). Furthermore, the location measurement unit 14 transmits information, which is acquired by associating the measured location information with an identifier of the location measurement unit 14, to the radio wave measurement server 30. At this time, the location measurement unit 14 maintains association of the latitude and the longitude with the area, and is capable of performing conversion on the measured location information into the area, and transmitting the area to the radio wave measurement server 30. It is possible to perform the conversion from the location information (the latitude and the longitude) to the area on a side of the radio wave measurement server 30. It is possible to regularly perform the location measurement, it is possible to perform the location measurement in a case where the radio wave measurement trigger is received, and it is possible to perform the location measurement at an arbitrary timing.

The request reception unit 15 is a processing unit which receives various requests from the radio wave measurement server 30. Specifically, in a case where the request reception unit 15 receives the terminal inducement trigger and the radio wave measurement trigger, the request reception unit 15 displays various screens, which are transmitted as the respective triggers, on a display unit such as a display. For example, in a case where the request reception unit 15 receives a terminal inducement request screen as the terminal inducement trigger, the request reception unit 15 displays the screen illustrated in FIG. 5. In a case where the request reception unit 15 receives the radio wave measurement request screen as the radio wave measurement trigger, the request reception unit 15 displays the screen illustrated in FIG. 6.

The measurement unit 16 is a processing unit which measures the radio wave situation. Specifically, in a case where a "reward GET!" button of the radio wave measurement request screen, which is displayed by the request reception unit 15, is selected, the measurement unit 16 measures the radio wave situation. Furthermore, the measurement unit 16 acquires the measured location information from the location measurement unit 14. Furthermore, the measurement unit 16 transmits the measurement result, which includes the location information, the measured radio wave situation, and the identifier of the measurement unit 16, to the radio wave measurement server 30.

For example, the measurement unit 16 is capable of measuring a radio wave intensity as the radio wave situation by performing communication for a process between the measurement unit 16 and the base station of an area where the measurement unit 16 exists. The radio wave situation is not limited thereto, and it is possible to use other various indexes, such as a success rate and a failure rate of packet transmission. It is possible to change the radio wave situation to be measured according to the communication carrier.

The reward reception unit 17 is a processing unit which receives a reward from the radio wave measurement server 30. For example, the reward reception unit 17 exists in the measurement target area. Furthermore, in a case where it is possible to properly transmit the measurement result to the radio wave measurement server 30, the reward reception unit 17 receives various rewards which are granted by the radio wave measurement server 30.

Subsequently, various processes, which are performed by the radio wave measurement system, will be described. Here, a flow of a general process, a flow of a terminal inducement process, a flow of a measurement result reception process, and a flow of a mobile terminal process will be described.

Figure 7:
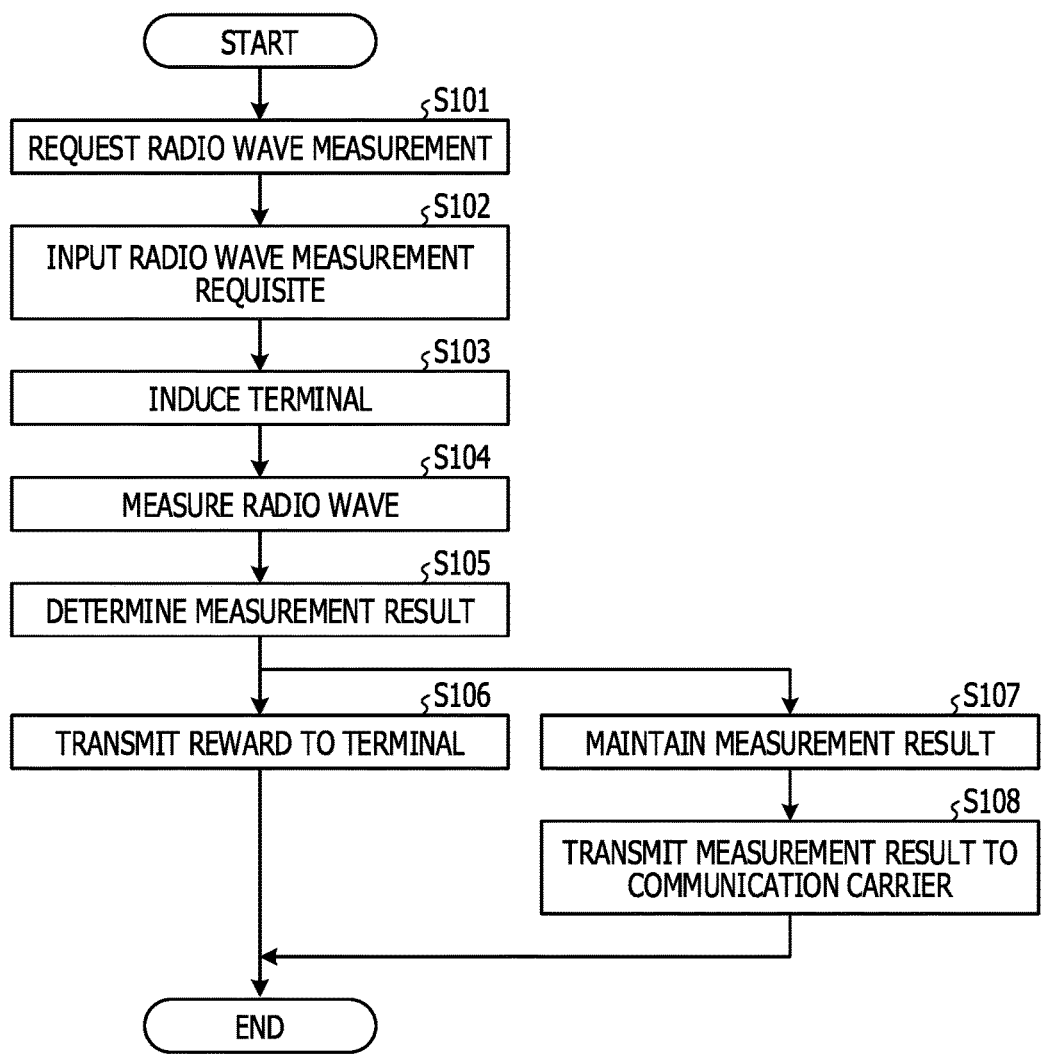
FIG. 7 is a flowchart illustrating a general flow of a radio wave measurement process.

FIG. 7 is a flowchart illustrating a general flow of a radio wave measurement process. As illustrated in FIG. 7, first, the radio wave measurement server 30 receives a radio wave measurement request (S101). Subsequently, the radio wave measurement server 30 receives an input of the radio wave measurement request and stores the input of the radio wave measurement request in the requisite management DB 33 (S102).

Subsequently, the radio wave measurement server 30 performs the terminal inducement process (S103). Thereafter, the radio wave measurement server 30 performs the radio wave measurement process (S104). Furthermore, in a case where the radio wave measurement server 30 receives a measurement result from each of the mobile terminals, the radio wave measurement server 30 determines the measurement result (S105).

After the process in S105 is performed, the radio wave measurement server 30 transmits a reward to the mobile terminal (S106). Furthermore, the radio wave measurement server 30 maintains the measurement result in parallel with the process in S106 (S107). Furthermore, the radio wave measurement server 30 transmits the measurement result to the communication carrier (S108).

Figure 8:
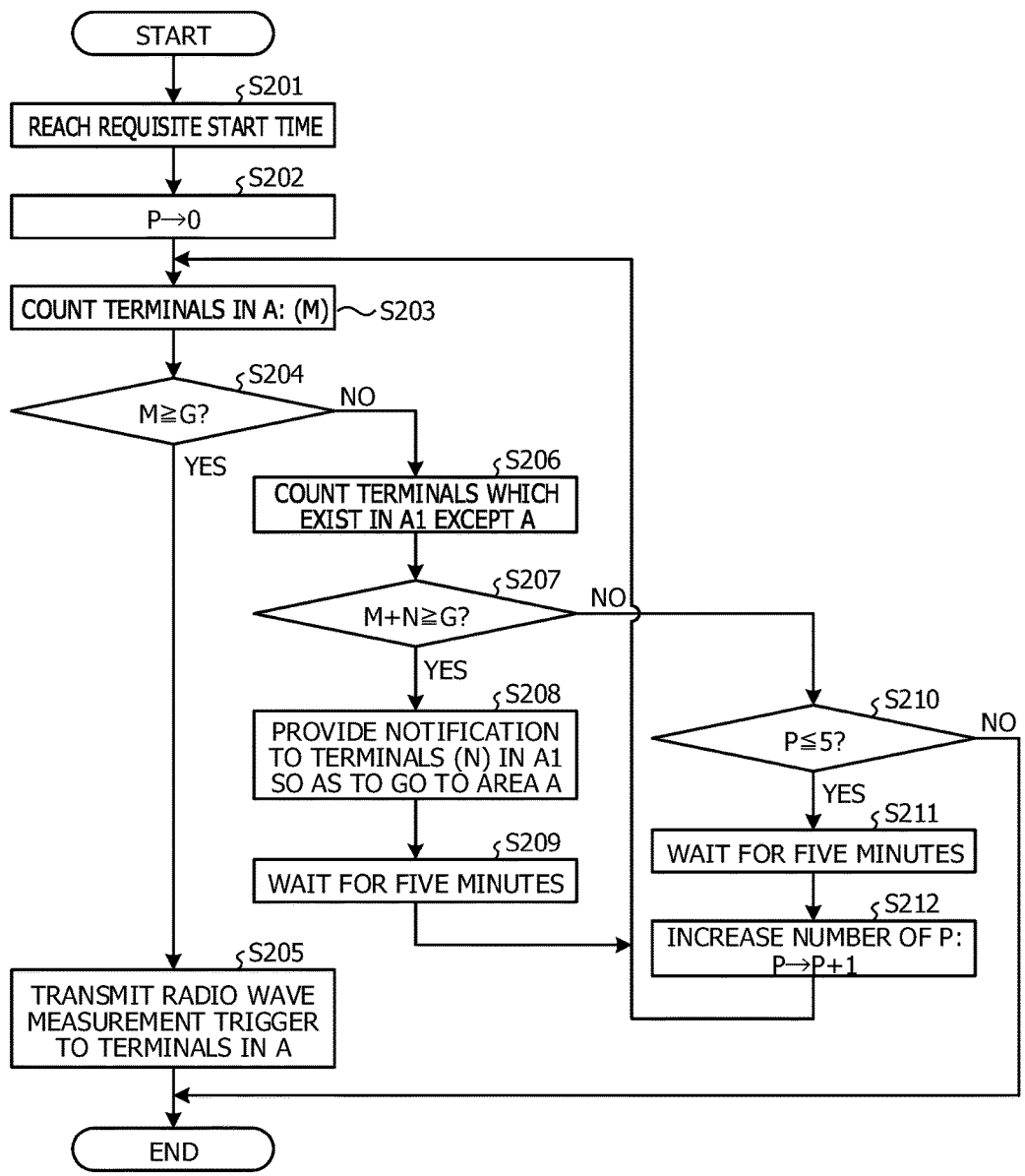
FIG. 8 is a flowchart illustrating a flow of a terminal inducement process.

FIG. 8 is a flowchart illustrating the flow of the terminal inducement process. Here, an example in which the area A is the radio wave measurement target will be described.

As illustrated in FIG. 8, in a requisite start time (S201), the terminal management unit 42 substitutes 0 for a variable P (S202). Subsequently, the terminal management unit 42 counts the number of mobile terminals, which exist in the area A, with reference to the terminal management DB 34 (S203). It is assumed that the number, which is counted here, is M.

Subsequently, in a case where a count number M is equal to or larger than G which is a terminal threshold number (limit number) (S204: Yes), the radio wave measurement unit 43 transmits the radio wave measurement trigger to the mobile terminals in the area A (S205).

In contrast, in a case where the count number M is smaller than G which is the terminal threshold number (limit number) (S204: No), the radio wave measurement unit 43 counts the number of mobile terminals in the area A1 except the area A (S206). Here, it is assumed that the counted number is N.

Furthermore, in a case where M+N is equal to or larger than G (S207: Yes), the radio wave measurement unit 43 provides a notification such that the mobile terminals in the area A1 move to the area A (S208). That is, the radio wave measurement unit 43 transmits the terminal inducement trigger to the mobile terminals in the area A1. Thereafter, after the radio wave measurement unit 43 waits 5 minutes which correspond to an example of the prescribed time (S209), the radio wave measurement unit 43 returns to S203 and repeats subsequent processes.

In contrast, in a case where M+N is smaller than G (S207: No), the terminal management unit 42 determines whether or not the variable P is equal to or smaller than a threshold (5) (S210). Here, in a case where the variable P is equal to or smaller than the threshold (5) (S210: Yes), the terminal management unit 42 waits 5 minutes which correspond to the example of the prescribed time (S211), thereafter, the terminal management unit 42 increments the variable P (S212), returns to S203, and repeats subsequent processes. In contrast, in a case where the variable P is larger than the threshold (5) (S210: No), the terminal management unit 42 ends the process.

Figure 9:
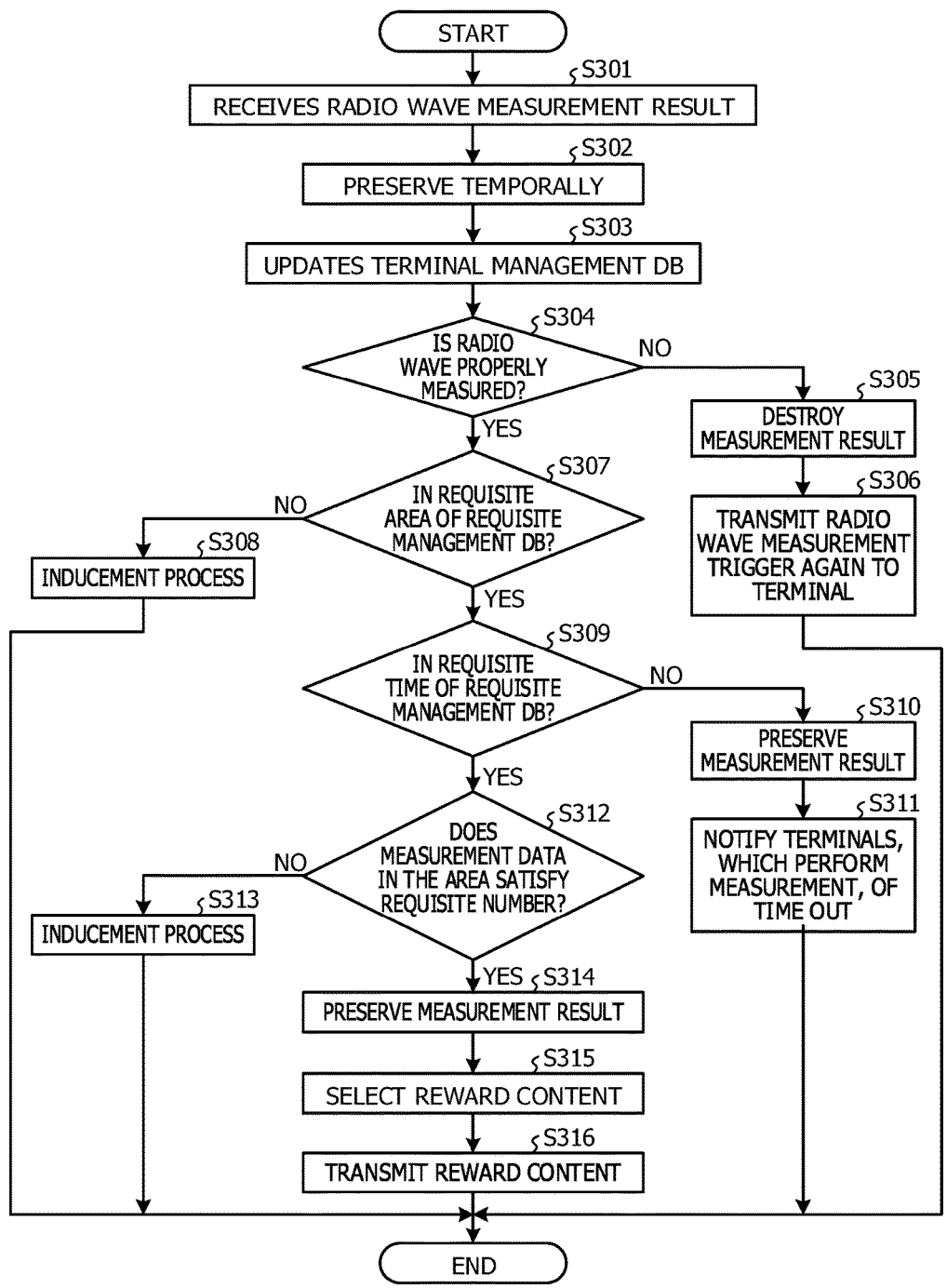
FIG. 9 is a flowchart illustrating a flow of a measurement result reception process.

FIG. 9 is a flowchart illustrating the flow of the measurement result reception process. As illustrated in FIG. 9, in a case where the radio wave measurement unit 43 receives a radio wave measurement result from each of the mobile terminals (S301), the radio wave measurement unit 43 temporally preserves the radio wave measurement result in the storage unit 32 or the like (S302).

Subsequently, the radio wave measurement unit 43 updates the terminal management DB 34 using the received measurement result (S303). Specifically, the radio wave measurement unit 43 extracts the terminal ID, the location information, and time from the measurement result. Furthermore, the radio wave measurement unit 43 specifies a record corresponding to the terminal ID from the terminal management DB 34. Furthermore, the radio wave measurement unit 43 updates the location information and the time of the specified record with the location information and the time which are extracted from the measurement result.

Furthermore, the radio wave measurement unit 43 determines whether or not the radio wave is properly measured based on the radio wave situation (measurement data) included in the measurement result (S304). In a case where it is determined that the radio wave is not properly measured (S304: No), the radio wave measurement unit 43 destroys the measurement result (S305). Furthermore, the radio wave measurement unit 43 transmits the radio wave measurement trigger again to the mobile terminal (S306).

In contrast, in a case where it is determined that the radio wave is properly measured (S304: Yes), the radio wave measurement unit 43 determines whether or not the measurement location of the measured radio wave situation exists in a requisite area which is managed by the requisite management DB 33 (S307).

In a case where it is determined that the measurement location exists outside the requisite area (S307: No), that is, in a case of a measurement result which is measured outside the measurement target area, the radio wave measurement unit 43 causes the terminal management unit 42 to execute the terminal inducement process of FIG. 8 (S308).

In contrast, in a case where it is determined that the measurement location exists in the requisite area (S307: Yes), the radio wave measurement unit 43 determines whether or not the measurement time of the measured radio wave situation exists in the requisite time (between the start time and the end time) which is managed by the requisite management DB 33 (S309).

In a case where it is determined that the measurement time of the measured radio wave situation exists outside the requisite time (S309: No), the radio wave measurement unit 43 preserves the measurement result in the measurement result DB 35 (S310). Furthermore, the radio wave measurement unit 43 notifies the mobile terminals, which perform the measurement, of time out (S311).

In contrast, in a case where it is determined that the measurement time of the measured radio wave situation exists in the requisite time (S309: Yes), the radio wave measurement unit 43 determines whether or not the measurement result in the area satisfies a requisite number (S312). Here, in a case where it is determined that the measurement result does not satisfy the requisite number (S312: No), the radio wave measurement unit 43 causes the terminal management unit 42 to execute the terminal inducement process of FIG. 8 (S313).

In contrast, in a case where it is determined that the measurement result satisfies the requisite number (S312: Yes), the radio wave measurement unit 43 preserves the measurement result in the measurement result DB 35 (S314). Furthermore, the radio wave measurement unit 43 selects a reward for each of the mobile terminals which measure a normal radio wave situation (S315). Furthermore, the radio wave measurement unit 43 transmits the selected reward to each of the mobile terminals (S316).

Figure 10:
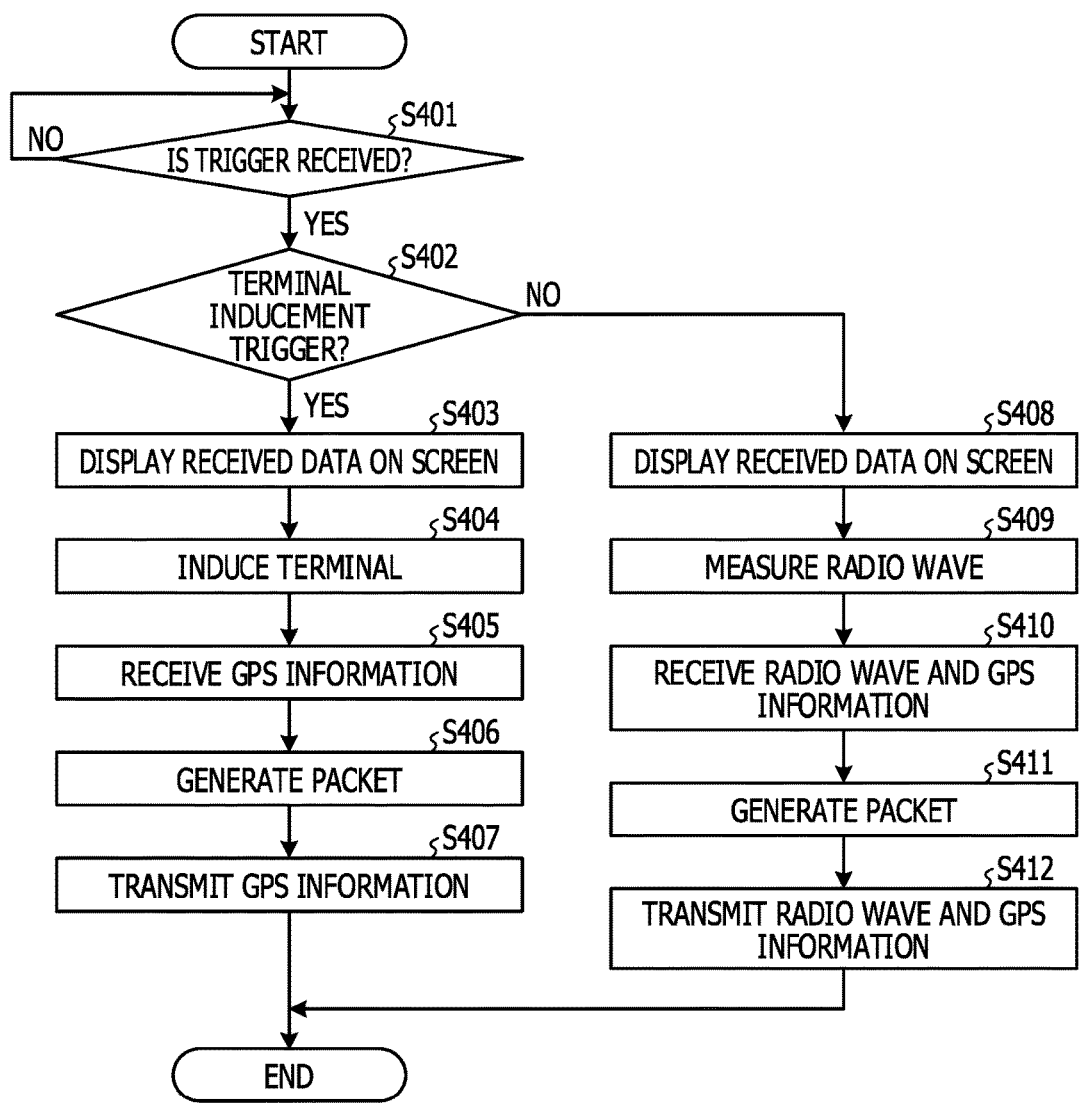
FIG. 10 is a flowchart illustrating a flow of a process performed by a mobile terminal.

FIG. 10 is a flowchart illustrating a flow of a process performed by the mobile terminal. As illustrated in FIG. 10, in a case where the request reception unit 15 of the mobile terminal 10 receives a trigger (S401: Yes), the request reception unit 15 determines whether or not the trigger is the terminal inducement trigger (S402).

In a case where the terminal inducement trigger is received (S402: Yes), the request reception unit 15 displays a received inducement screen (S403). Furthermore, the request reception unit 15 performs terminal inducement (S404). Thereafter, the location measurement unit 14 receives GPS information as the location information (S405). Furthermore, the location measurement unit 14 generates a packet which includes the GPS information (S406), and transmits the GPS information to the radio wave measurement server 30 (S407).

In contrast, in a case where radio wave measurement trigger is received other than the terminal inducement trigger (S402: No), the request reception unit 15 displays a received radio wave measurement request screen (S408). Furthermore, the request reception unit 15 performs the radio wave measurement according to an operation of the user (S409).

Subsequently, the measurement unit 16 receives the GPS information as the location information (S410). Furthermore, the measurement unit 16 generates a packet of the measurement result which includes the measurement data and the GPS information (S411). Furthermore, the measurement unit 16 transmits the packet to the radio wave measurement server 30 (S412).

As described above, the radio wave measurement server 30 is capable of inducing the user to move to a prescribed location by giving incentives, which is called the rewards, to the user, and is capable of performing the radio wave measurement under a condition demanded by the communication carrier. Since it is possible to use the user terminal without causing a worker to go to a field, costs is made lower. In a case where dynamic management of the locations of the mobile terminals, which is seldom performed so far because of the influence of the cost, is performed, it is possible to treat mobile terminals of general users as a group, and it is possible to measure radio wave information in more various requisites.

The radio wave measurement server 30 is capable of improving a participation rate by transmitting an image, in which a reward appears on an entire surface, as the terminal inducement trigger. The radio wave measurement server 30 is capable of improving the participation rate by transmitting a display of a way to go to the requisite area from a present place as the terminal inducement trigger through cooperation with an external application. The radio wave measurement server 30 is capable of improving the participation rate by transmitting a map, in which a fact that a user exists in the requisite area is intuitively known, or a screen, which emphasizes that the reward can be acquired, as the radio wave measurement trigger.

In a case where a format of content to be input to the requisite management DB 33 is made, it is possible for the communication carrier to instantly input the requisite. In the input start time, the trigger is automatically transmitted to the mobile terminal and the radio wave measurement starts, and thus the radio wave measurement server 30 is capable of causing the radio wave measurement to be automatically performed after the requisite is input.

Second Embodiment

In first embodiment, an example is described in which the auxiliary measurement area is determined in advance. In contrast, it is possible to dynamically determine the auxiliary measurement area. Here, in second embodiment, as a detailed example in which the auxiliary measurement area is dynamically determined, an example in which the auxiliary measurement area is determined according to a difference between a requisite number, which is indicated by the number of terminals stored in the requisite management DB 33, and the number of terminals which are actually counted will be described.

Figure 11:
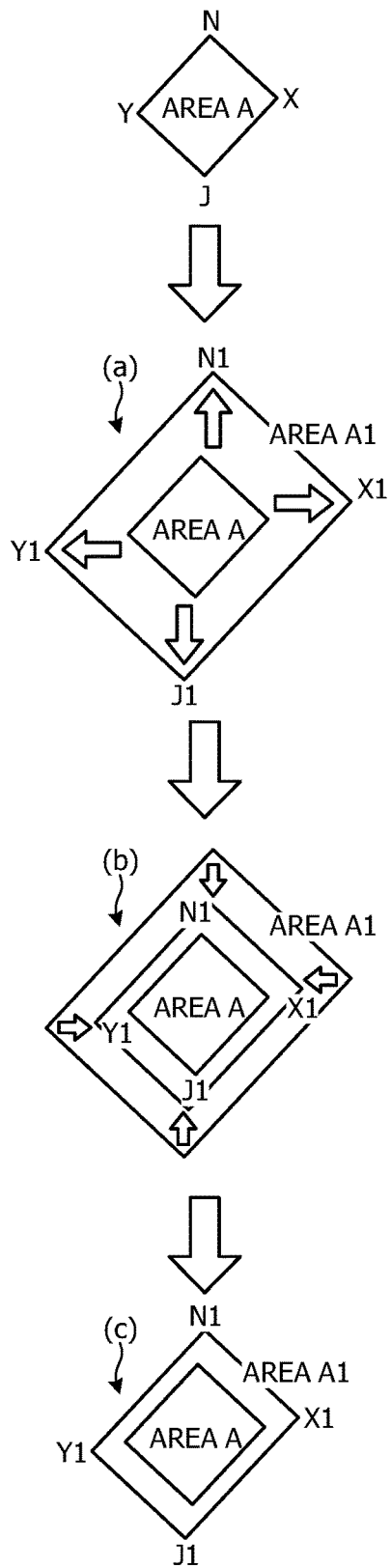
FIG. 11 is a diagram illustrating determination of an auxiliary measurement area.

FIG. 11 is a diagram illustrating determination of the auxiliary measurement area. FIG. 11 illustrates an example in which, since the number of terminals in the area A does not satisfy the requisite number in a state in which the area A that is the measurement target is determined in advance, the auxiliary measurement area A1 is dynamically determined and the mobile terminals in the auxiliary measurement area A1 are induced to move to the area A.

As illustrated in (a) of FIG. 11, it is possible for the terminal management unit 42 to set vertexes, which are acquired by expending respective vertexes (X, Y, J, and N) of the area A, to vertexes (X1, Y1, J1, and N1) of the auxiliary measurement area A1 according to a difference D between the number of mobile terminals which are located in the area A and the requisite number which is set for the area A. For example, the terminal management unit 42 expands the vertexes by multiplying coordinates of the respective vertexes by "constant×D". Furthermore, the terminal management unit 42 induces the mobile terminals in the auxiliary measurement area A1, which is determined as above, to move to the area A.

Furthermore, as illustrated in (b) of FIG. 11, the terminal management unit 42 performs reduction on the vertexes of the auxiliary measurement area A1 according to a density of the mobile terminals in the area A. For example, the terminal management unit 42 performs division on the coordinates of the respective vertexes of the extended auxiliary measurement area A1 by the density, thereby performing reduction on the respective vertexes. Furthermore, as illustrated in (c) of FIG. 11, the terminal management unit 42 induces the mobile terminals in the auxiliary measurement area A1, which is determined as above, to the area A.

Figure 12B:
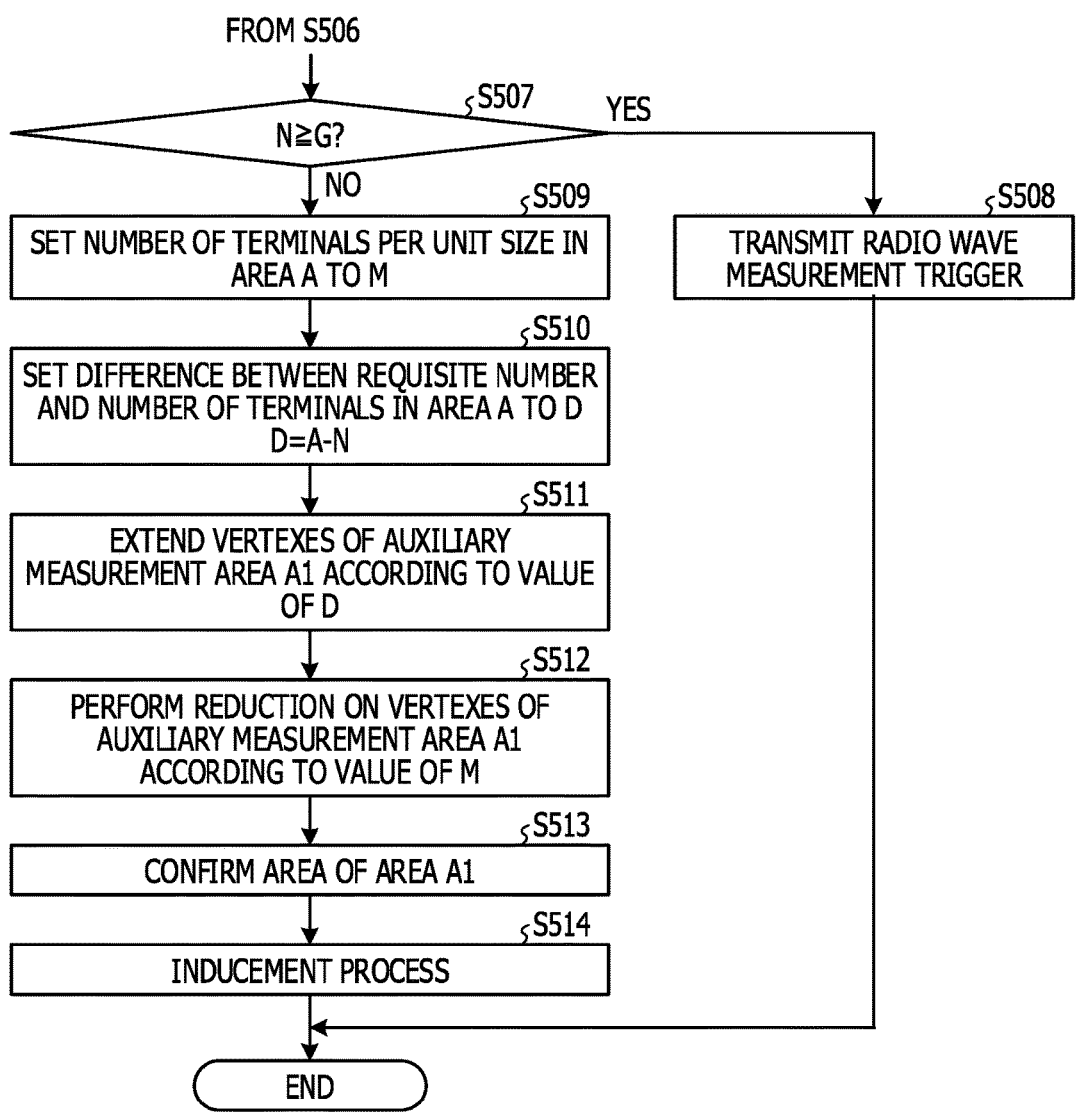

Subsequently, a flow of the process illustrated in FIG. 11 will be described. FIG. 12A and FIG. 12B are flowcharts illustrating a flow of the auxiliary measurement area determination process. As illustrated in FIG. 12A, the terminal management unit 42 sets a point, which has the highest latitude, of the area A to N and sets a point, which has the lowest latitude, to J (S501). The terminal management unit 42 sets a point, which has the easternmost longitude, of the area A to X and sets a point, which has the westernmost longitude, to Y (S502).

Subsequently, the terminal management unit 42 sets a point, which has the highest longitude, of the auxiliary measurement area A1 to N1, and sets a point, which has the lowest longitude, to J1 (S503). The terminal management unit 42 sets a point, which has the easternmost longitude, of the auxiliary measurement area A1 to X1 and sets a point which has the westernmost longitude, to Y1 (S504).

Furthermore, the terminal management unit 42 calculates a size (S) of the measurement area A (S505). Furthermore, the terminal management unit 42 counts the number (N) of mobile terminals in the measurement area A (S506). Here, in a case where the terminal management unit 42 determines that N is equal to or larger than the threshold (G) (S507: Yes), the radio wave measurement unit 43 transmits the radio wave measurement trigger to the mobile terminals in the area A (S508), as illustrated in FIG. 12B.

In contrast, in a case where it is determined that N is smaller than the threshold (G) (S507: No), the terminal management unit 42 calculates the number (M=N/S) of terminals per a unit size in the area A (S509), as illustrated in FIG. 12B. Subsequently, the terminal management unit 42 calculates a difference (D=G−N) between the requisite number and the number of terminals in the area A (S510).

Subsequently, the terminal management unit 42 extends the respective vertexes of the auxiliary measurement area A1 according to a value of D (S511). Furthermore, the terminal management unit 42 performs reduction on the respective extended vertexes according to a value of M (S512). Thereafter, the terminal management unit 42 confirms an area of the auxiliary measurement area A1 (S513). Furthermore, the terminal management unit 42 performs the inducement process (S514).

As described above, since it is possible for the radio wave measurement server 30 to dynamically determine the auxiliary measurement area, it is possible to rapidly determine an area which satisfies the requisite number, and it is possible to effectively collect the mobile terminals. Since the radio wave measurement server 30 is capable of suppressing undesired area extension, it is possible to reduce communication costs.

Third Embodiment

In second embodiment, an example is described in which the auxiliary measurement area is dynamically determined. However, the embodiment is not limited thereto. It is possible to search a plurality of auxiliary measurement areas for an arbitrary auxiliary measurement area and to select the auxiliary measurement area. Here, in third embodiment, a detailed example will be described in which an auxiliary measurement area is selected by searching for the auxiliary measurement area.

First, the radio wave measurement server 30 includes an extension range DB 36 and a reduction range DB 37. The extension range DB 36 is a database which defines an extension range of an area. The reduction range DB 37 is a database which defines a reduction range of an area.

FIG. 13 is a table illustrating an example of information stored in the extension range DB 36. The extension range DB 36 stores "0% to 9%, A", "10% to 19%, B", or the like as "a ratio (%) of the number of terminals in the measurement area to the requisite number, an extension range". An example is provided in a case where a ratio of the number of terminals in the measurement area A to the requisite number is 8%, an area in which extension is performed on the respective vertexes of the measurement area by A (m or Km) is set to the auxiliary measurement area.

FIG. 14 is a table illustrating an example of information stored in the reduction range DB 37. The reduction range DB 37 stores "M1<M≤M2, a", "M2<M≤M3, b", or the like as "density in the measurement area (the number of terminals/$Km^2$ or the number of terminals/$m^2$), reduction range". An example is provided in a case where a density of the mobile terminals in the measurement area A is M, an area in which reduction is performed on the respective vertexes of the measurement area by a(m or Km) is set to the auxiliary measurement area.

Figure 16:
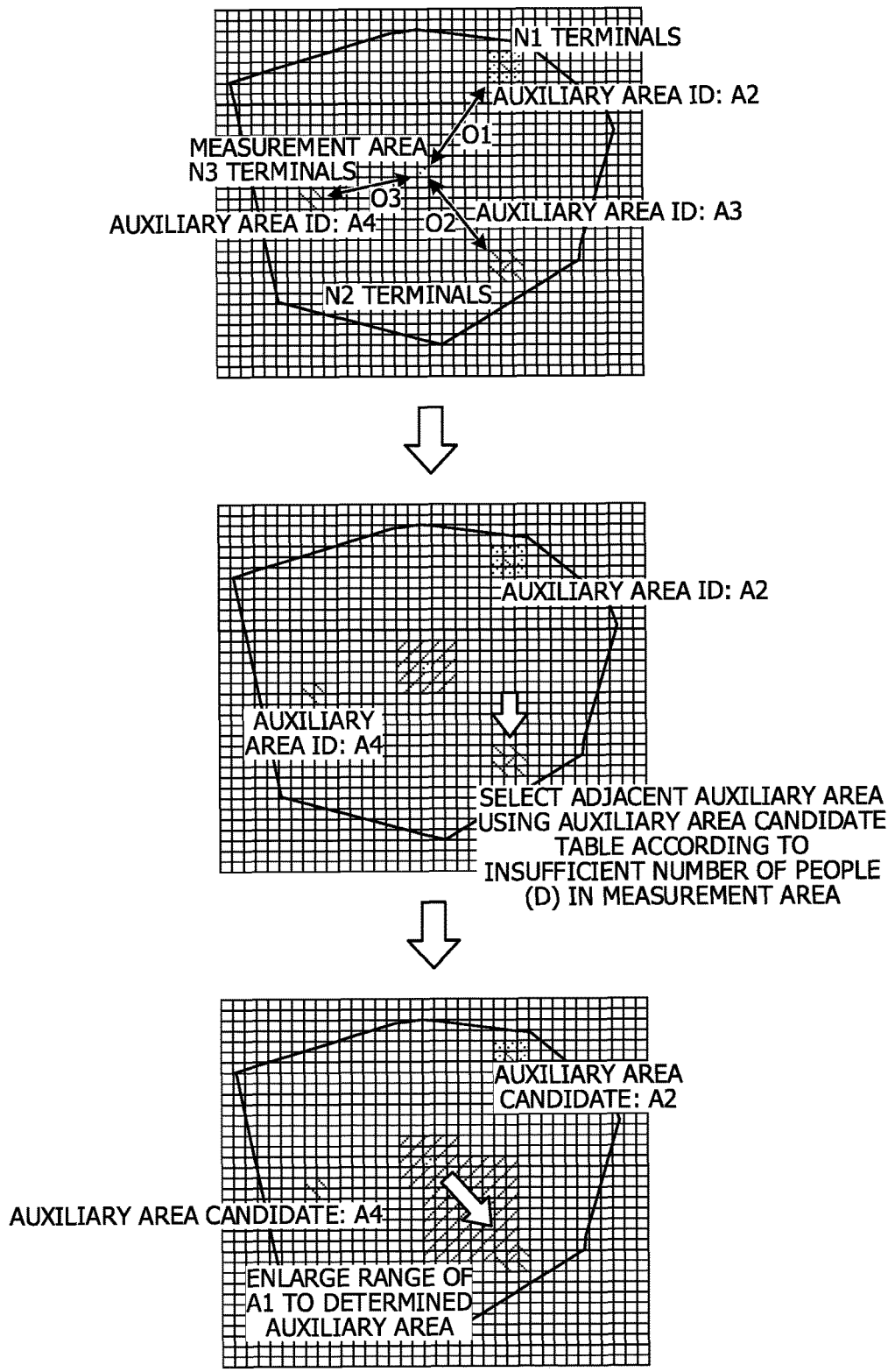
FIG. 16 is a diagram illustrating selection of the auxiliary measurement area.

Extension, reduction, and selection of the auxiliary measurement area in such a state will be described. FIG. 15 is a diagram illustrating extension and reduction of the auxiliary measurement area, and FIG. 16 is a diagram illustrating selection of the auxiliary measurement area. Here, although an example is described in which a selection process is performed after extension and reduction processes are performed, the embodiment is not limited thereto and it is possible to perform only any one of the processes.

As illustrated in FIG. 15, the terminal management unit 42 calculates the size (S) of the measurement area A, and counts the number (N) of mobile terminals in the measurement area A. Subsequently, the terminal management unit 42 calculates a ratio (Q) of the number of mobile terminals in the measurement area to the requisite number, and specifies an extension range corresponding to the ratio (Q) from the extension range DB 36. Furthermore, the terminal management unit 42 performs extension on the respective vertexes of the area A according to the specified extension range, and sets the extended vertexes to the respective vertexes of the auxiliary measurement area A1.

Subsequently, the terminal management unit 42 calculates a terminal density (M) of the measurement area. Furthermore, the terminal management unit 42 specifies a reduction range corresponding to the terminal density (M) from the reduction range DB 37. Furthermore, the terminal management unit 42 performs reduction on the respective vertexes of the auxiliary measurement area A1, which is acquired through the extension performed on the respective vertexes of the area A, according to the specified reduction range.

Thereafter, in a case where the number (N) of terminals in the measurement area A is larger than a threshold (Z) used to determine whether or not to start search for an auxiliary measurement area candidate which is separated from the measurement area A, the terminal management unit 42 transmits the radio wave measurement trigger to the mobile terminals in the measurement area A.

Here, as illustrated in FIG. 16, in a case where the number (N) of terminals in the measurement area A is equal to or smaller than the threshold (Z), the terminal management unit 42 grants A2, A3, and A4 as auxiliary area IDs to areas in the vicinity of the measurement area A. Subsequently, the terminal management unit 42 counts the number of terminals in each of the auxiliary area candidates. Here, an auxiliary area candidate A2 (N1), an auxiliary area candidate A3 (N2), and an auxiliary area candidate A4 (N3) are set. Furthermore, the terminal management unit 42 calculates a distance (Ox) between the measurement area A and each of the auxiliary area candidates. Here, a distance (O1) between the measurement area A and the auxiliary area candidate A2, a distance (O2) between the measurement area A and the auxiliary area candidate A3, a distance (O3) between the measurement area A and the auxiliary area candidate A4 are set. For example, a distance between centers of the areas is used as the distance.

Furthermore, the terminal management unit 42 generates an auxiliary area management DB 51 in which an auxiliary area ID, the number of terminals in the area, and a distance are associated. FIG. 17 is a table illustrating an example of information stored in the auxiliary area management DB 51. As illustrated in FIG. 17, the auxiliary area management DB 51 stores the "auxiliary area ID, the number of terminals in the area, and the distance from the measurement area" through association. Here, the auxiliary area ID corresponds to A2, A3, and A4. The number of terminals in the area corresponds to N1, N2, and N3. The distance from the measurement area corresponds to O1, O2, and O3.

Subsequently, the terminal management unit 42 sets a value which is used to select the auxiliary area candidate to a priority index (K), sets a constant which indicates a ratio of a distance to the number of terminals to "α", and multiplies the distance Ox by the constant (α). Furthermore, the terminal management unit 42 calculates the priority index by adding the multiplied value to the number of terminals in the auxiliary area candidate. That is, the terminal management unit 42 calculates the priority index in such a way that "K=α×distance (Ox)+the number of terminals (Nx)". Here, it is assumed that the terminal management unit 42 calculates "K2" as the priority index of the auxiliary area candidate A2, calculates "K3" a as the priority index of the auxiliary area candidate A3, and calculates "K1" as the priority index of the auxiliary area candidate A4. It is assumed that K1>K2>K3, and K1 is the highest in a priority order.

Furthermore, the terminal management unit 42 generates an auxiliary area candidate DB 52 in which an auxiliary area ID, a priority index, and a priority order are associated. FIG. 18 is a table illustrating an example of information stored in the auxiliary area candidate DB 52. As illustrated in FIG. 18, the auxiliary area candidate DB 52 stores the "auxiliary area ID, the priority index, and the priority order" through association. Here, the auxiliary area ID corresponds to A2, A3, and A4. The priority index corresponds to K1, K2, and K3. The priority order is set such that an auxiliary area candidate A4 having the highest priority index K1 is 1, an auxiliary area candidate A2 having a second highest priority index K2 is 2, and an auxiliary area candidate A3 having the lowest priority index K3 is 3.

The priority orders which are determined here may be used without change. However, furthermore, it is possible to consider the priority order according to the ratio (Q) of the number of mobile terminals in the measurement area to the requisite number. For example, the terminal management unit 42 includes an auxiliary area determination reference DB 53 illustrated in FIG. 19. FIG. 19 is a table illustrating an example of information stored in the auxiliary area determination reference DB 53. As illustrated in FIG. 19, the auxiliary area determination reference DB 53 stores "a range of Q and a priority order" through association. Here, the "range of Q" is a ratio of the number of terminals in the measurement area to the requisite number. The "priority order" is a priority which is selected as an auxiliary area. For example, FIG. 19 illustrates that Q, which is equal to or larger than Qa and is smaller than Qb, has the highest priority order.

Furthermore, the terminal management unit 42 multiplies each of the auxiliary area candidates A2, A3, and A4 by the priority order illustrated in FIG. 18 and the priority order which is associated with Q calculated for each of the auxiliary area candidates. Furthermore, the terminal management unit 42 determines the priority order again in order of a small calculated result. It is possible to update the priority order of the auxiliary area candidate DB 52 of FIG. 18.

For example, the terminal management unit 42 calculates the multiplied value (2) for the auxiliary area candidate A4 based on the priority order (1) illustrated in FIG. 18 and the priority order (2) which is associated with Q calculated for each of the auxiliary area candidates. Similarly, the terminal management unit 42 calculates the multiplied value (8) for the auxiliary area candidate A2 based on the priority order (2) illustrated in FIG. 18 and the priority order (4) which is associated with Q calculated for each of the auxiliary area candidates. The terminal management unit 42 calculates the multiplied value (3) for the auxiliary area candidate A3 based on the priority order (3) illustrated in FIG. 18 and the priority order (1) which is associated with Q calculated for each of the auxiliary area candidates. That is, the multiplied value is the smallest in the auxiliary area candidate A4 and becomes larger in order of A3 and A2.

As a result, the terminal management unit 42 updates "A4, K1, 1", "A2, K2, 2", and "A3, K3, 3" of the auxiliary area candidate DB 52 to "A4, K1, 1", "A2, K2, 3", and "A3, K3, 2" such that the priority order becomes higher in order of small multiplied value. In a case where the multiplied values are the same, it is possible to arbitrarily set a selection method in such a way that priory is given to the priority order of the auxiliary area candidate DB 52.

Returning to FIG. 16, the terminal management unit 42 selects an auxiliary area according to the priority order stored in the auxiliary area candidate DB 52. In the example, it is assumed that the terminal management unit 42 selects the auxiliary area candidate A3. If so, the terminal management unit 42 extends an area of the auxiliary measurement area A1, which is determined in FIG. 15, up to the auxiliary area candidate A3. For example, the terminal management unit 42 extends the area of the auxiliary measurement area A1 such that the auxiliary area candidate A3 is included. As a result, the terminal management unit 42 induces mobile terminals which are located in the auxiliary measurement area A1 determined as described above and outside the measurement area A to move to the measurement area A.

Figure 20:
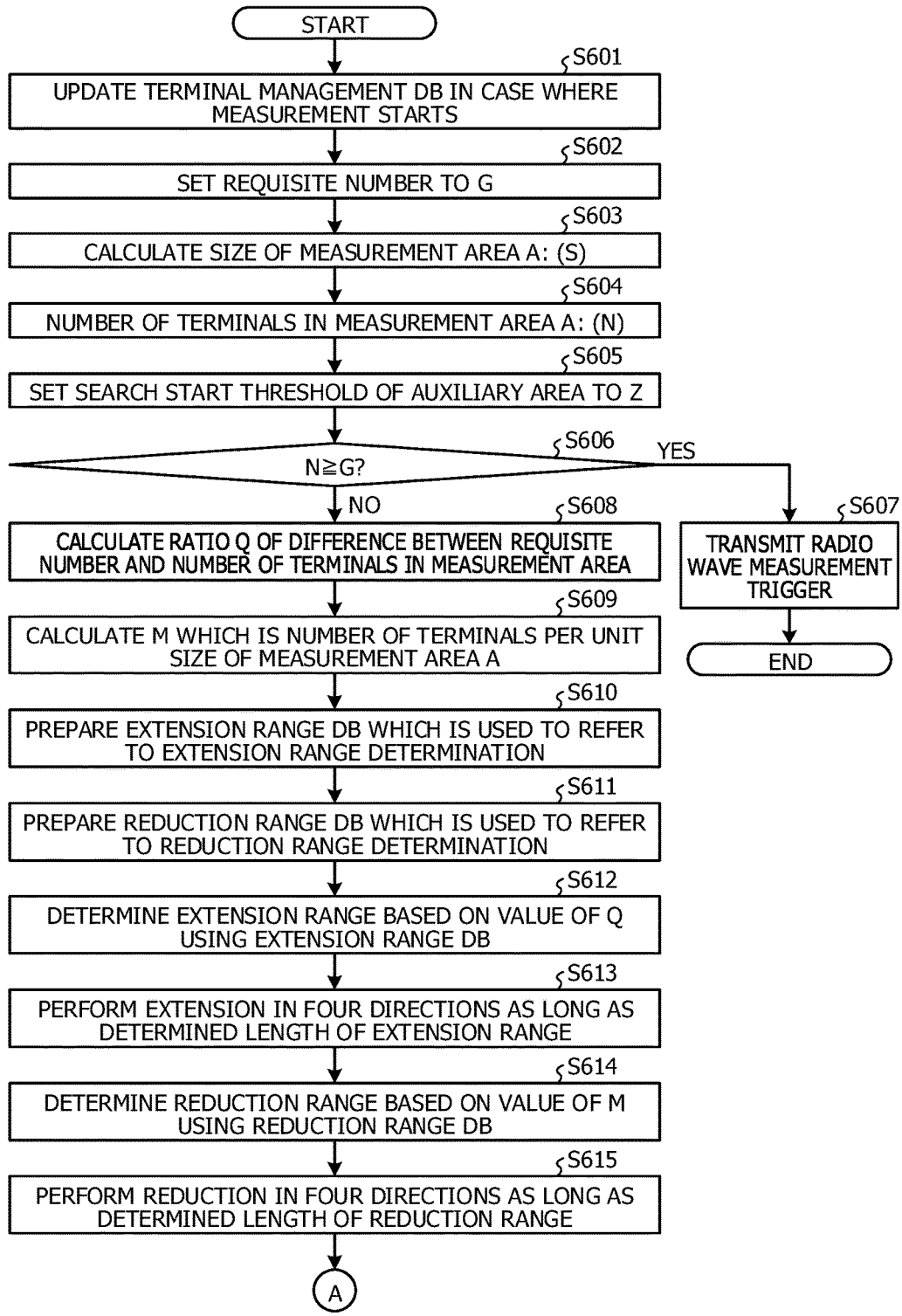
FIG. 20 is a flowchart illustrating a flow of an auxiliary measurement area selection and extension process.
Figure 21:
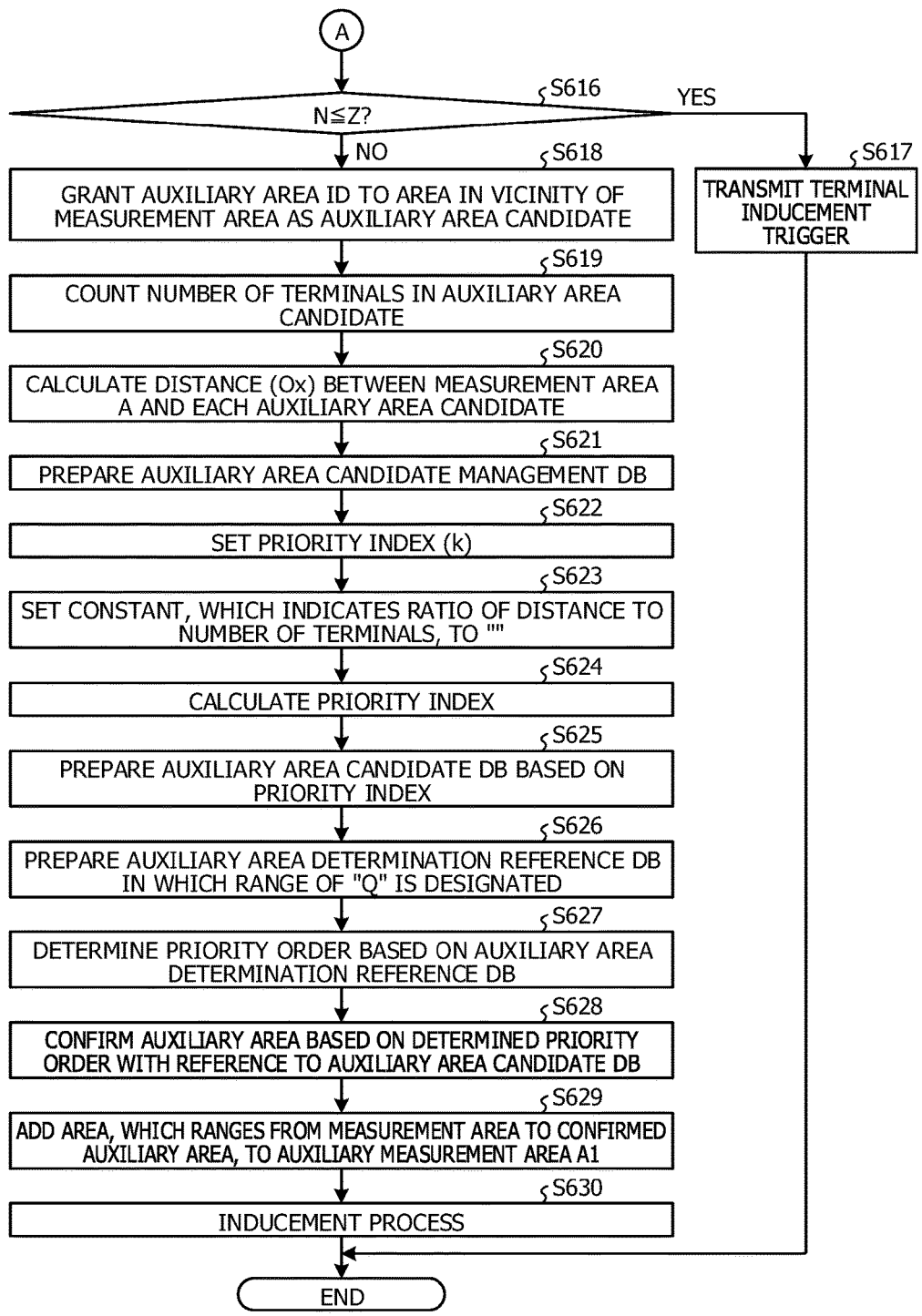
FIG. 21 is a flowchart illustrating a flow of the auxiliary measurement area selection and extension process.

Subsequently, a flow of the above described process will be described. FIGS. 20 and 21 are flowcharts illustrating a flow of an auxiliary measurement area selection and extension process. As illustrated in FIG. 20, for example, in prescribed time before the measurement starts, such as before 10 minutes, the terminal management unit 42 updates the terminal management DB 34 (S601).

Subsequently, the terminal management unit 42 reads the requisite number "G" which is read from the requisite management DB 33 (S602). Furthermore, the terminal management unit 42 calculates the size "S" of the measurement area A (S603). Furthermore, the terminal management unit 42 counts the number of terminals "N" of the mobile terminals in the measurement area A (S604). Here, the terminal management unit 42 sets a search start threshold of the auxiliary area candidate to "Z" (S605).

In a case where the terminal management unit 42 determines that the number "N" of mobile terminals in the measurement area A is equal to or larger than the requisite number "G" which is the threshold (S606: Yes), the radio wave measurement unit 43 transmits the radio wave measurement trigger to the mobile terminals in the measurement area A (S607).

In contrast, in a case where it is determined that the number "N" of mobile terminals in the measurement area A is smaller than the requisite number "G" (S606: No), the terminal management unit 42 calculates "Q=N/G×100" which is a ratio of the number of mobile terminals in the measurement area A to the requisite number (S608). Subsequently, the terminal management unit 42 calculates "M=N/S" which is the number of terminals per a unit size of the measurement area A (S609).

Thereafter, the terminal management unit 42 generates the extension range DB 36 which is used in a case where the extension range is determined according to information which is input from the manager or the like (S610). Furthermore, the terminal management unit 42 generates the reduction range DB 37 which is used in a case where the reduction range is determined (S611).

Subsequently, the terminal management unit 42 determines the extension range based on the ratio "Q", which is calculated in S608, with reference to the extension range DB 36 (S612). Thereafter, the terminal management unit 42 generates the auxiliary measurement area A1 by extending the measurement area A in four directions as long as the determined length of the extension range (S613). Subsequently, the terminal management unit 42 determines the reduction range based on "M", which is calculated in S609, with reference to the reduction range DB 37 (S614). Thereafter, the terminal management unit 42 performs reduction on the auxiliary measurement area A1 in four directions as long as the determined length of the reduction range (S615).

Thereafter, as illustrated in FIG. 21, in a case where the number "N" of terminals in the measurement area A is larger than the threshold "Z" (S616: Yes), the terminal management unit 42 transmits the terminal inducement trigger (S617).

In contrast, in a case where the number "N" of terminals in the measurement area A is equal to or smaller than the threshold "Z" (S616: No), the terminal management unit 42 grants auxiliary area IDs while assuming that the respective areas in the vicinity of the measurement area A are auxiliary area candidates (S618).

Subsequently, the terminal management unit 42 counts the number (Nx) of mobile terminals in each of the auxiliary area candidates (S619). Furthermore, the terminal management unit 42 calculates the distance (Ox) between the measurement area A and each of the auxiliary area candidates (S620). Furthermore, the terminal management unit 42 generates the auxiliary area management DB 51 using the auxiliary area ID, the number (Nx) of mobile terminals in the auxiliary area candidate, and the distance (Ox) between the measurement area A and the auxiliary area candidate (S621).

Here, the terminal management unit 42 sets the priority index to "K" (S622), and sets the constant, which indicates a ratio of the distance to the number of terminals, to "a" (S623). Furthermore, the terminal management unit 42 calculates the priority index (K) for each of the auxiliary area candidates using the distance (Ox), the constant α, and the number of terminals "Nx" (S624).

Furthermore, the terminal management unit 42 generates the auxiliary area candidate DB 52 using the auxiliary area ID and the priority index (S625). Subsequently, the terminal management unit 42 generates the auxiliary area determination reference DB 53, in which the range of the ratio "Q" is designated, based on the input of the manager or the like (S626).

Thereafter, the terminal management unit 42 determines the priority order of the auxiliary area candidate based on the auxiliary area determination reference DB 53 (S627). Furthermore, the terminal management unit 42 confirms the auxiliary area based on the determined priority order with reference to the auxiliary area candidate DB 52 (S628).

Furthermore, the terminal management unit 42 adds an area, which ranges from the measurement area A to the confirmed auxiliary area, to the auxiliary measurement area A1 (S629). Thereafter, the terminal management unit 42 performs the inducement process (S630).

As described above, it is possible for the radio wave measurement server 30 to dynamically determine an auxiliary measurement area which has a high possibility of satisfying the requisite number. Therefore, it is possible to rapidly perform inducement to the measurement area and it is possible to reduce time which is taken to reach the requisite number. Therefore, it is possible for the radio wave measurement server 30 to rapidly respond to the demands of the communication carrier, and it is possible to satisfy a service level expected by the communication carrier.

Fourth Embodiment

Hereinbefore, although the examples of the embodiments are described, the embodiments may be performed in various different forms in addition to the above-described example.

In the above examples, an example is described in which the auxiliary measurement area is determined by performing reduction after extension is performed on the measurement area. However, the embodiment is not limited thereto, and it is possible to perform any one of the reduction and expansion. An example is described in which one area is selected from a plurality of auxiliary area candidates. However, a selection method is not limited to the example, and, for example, it is possible to select an area using a distance from the measurement area, the number of mobile terminals which are located in each of the auxiliary area candidates, and the combination thereof.

Each configuration of each device illustrated in FIG. 2 may not be entirely configured as expressed in the drawing physically. That is, it is possible to distribute or combine the configuration in arbitrary units. For example, it is possible to combine the terminal management unit 42 and the radio wave measurement unit 43. Furthermore, a whole or arbitrary one of each processing function, which is performed in each device, may be realized by a central processing unit (CPU) and a program which is analyzed and executed by the CPU, or may be realized by hardware using wired logic.

It is possible to manually perform the whole or a part of the process, which is described as being automatically performed, in each of the processes described in the example. Otherwise, it is possible to automatically perform the whole or a part of the process, which is described as being manually performed, using a well-known method. In addition, unless specially mentioned, it is possible to arbitrarily change a process procedure, a control procedure, a detailed name, and information which includes various data and parameters that are described in the document and the drawings.

Figure 22:
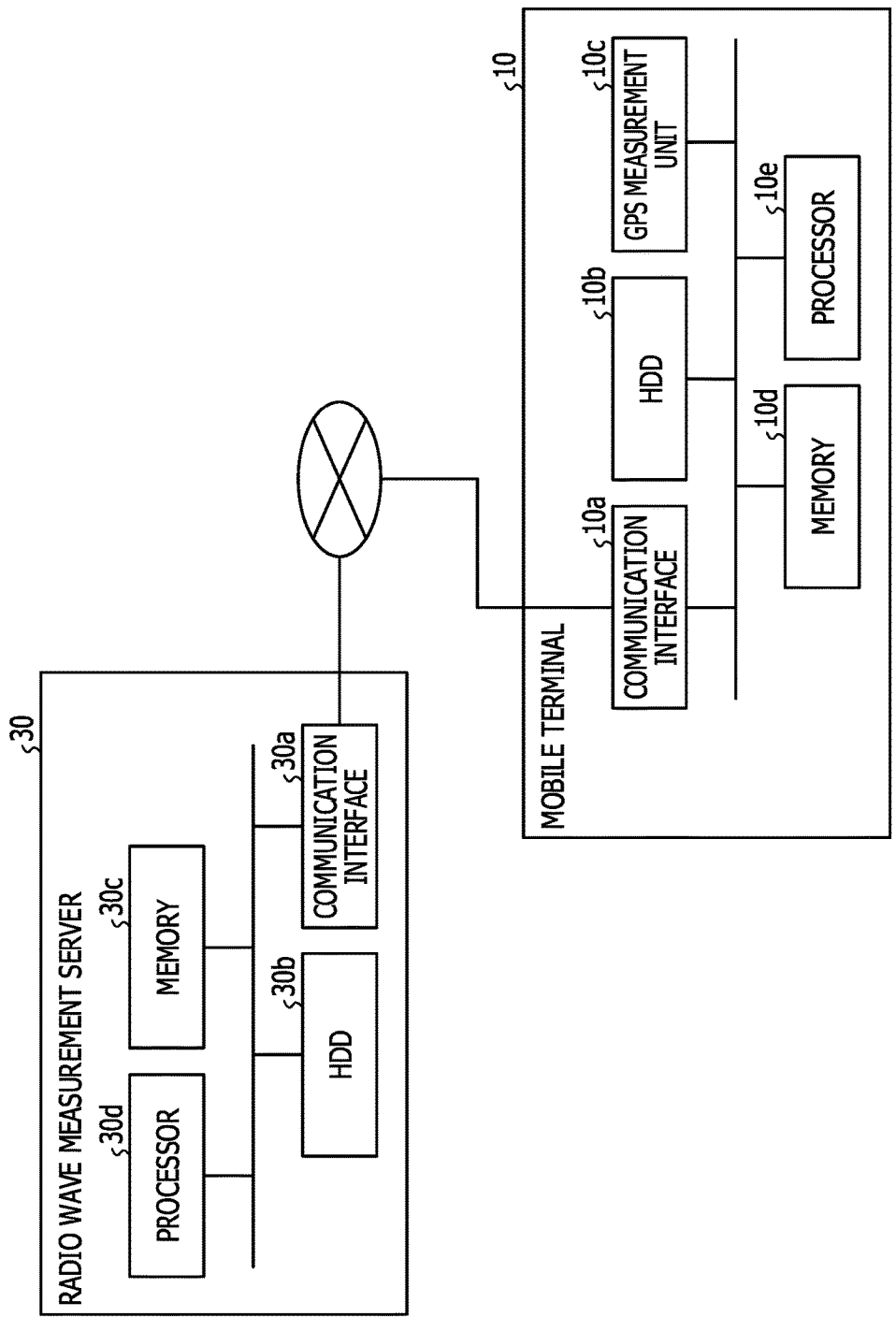
FIG. 22 is a diagram illustrating an example of a hardware configuration.

It is possible to realize the radio wave measurement server 30 and the mobile terminal 10 by, for example, a computer which has a hardware configuration as follows. FIG. 22 is a diagram illustrating an example of the hardware configuration. As illustrated in FIG. 22, the mobile terminal 10 may include a communication interface 10a, a hard disk drive (HDD) 10b, a GPS measurement unit 10c, a memory 10d, and a processor 10e. In addition thereto, the mobile terminal 10 may include another hardware such as an acceleration sensor.

The communication interface 10a is an interface which controls wireless communication. The HDD 10b is an example of a storage device which stores a program, data, and the like. The GPS measurement unit 10c acquires a present place which is measured by the GPS.

A random access memory (RAM), such as a synchronous dynamic random access memory (SDRAM), a read only memory (ROM), a flash memory, and the like may be examples of the memory 10d. A central processing unit (CPU), a digital signal processor (DSP), a field programmable gate array (FPGA), a programmable logic device (PLD), and the like may be examples of the processor 10e.

The mobile terminal 10 operates as an information processing apparatus which performs a radio wave measurement method by reading and executing the program. That is, the mobile terminal 10 executes a program which performs the same function as the location measurement unit 14, the request reception unit 15, the measurement unit 16, and the reward reception unit 17. As a result, it is possible for the mobile terminal 10 to perform a process of performing the same function as the location measurement unit 14, the request reception unit 15, the measurement unit 16, and the reward reception unit 17. A program referred to in another example is not limited to the program which is executed by the mobile terminal 10. For example, in a case where another computer or a server executes a program or in a case where a program is executed through cooperation of another computer and the server, it is possible to similarly apply the embodiment.

It is possible to distribute the program through a network such as the Internet. The program is recorded in a computer-readable recording medium, such as a hard disk, a flexible disk (FD), a CD-ROM, a magneto-optical disk (MO), and a digital versatile disc (DVD), and may be executed by being read from the recording medium by a computer.

As illustrated in FIG. 22, the radio wave measurement server 30 includes a communication interface 30a, an HDD 30b, a memory 30c, and a processor 30d. In addition thereto, the radio wave measurement server 30 may include another hardware such as a touch panel and a display.

The communication interface 30a is a communication interface which controls wired or wireless communication. The HDD 30b is an example of a storage device which stores a program, data, and the like. A RAM, such as a SDRAM, a ROM, and a flash memory may be examples of the memory 30c. A CPU, a DSP, a FPGA, a PLD, and the like may be examples of the processor 30d.

The radio wave measurement server 30 operates as an information processing apparatus which performs the radio wave measurement method by reading and executing a program. That is, the radio wave measurement server 30 executes a program which performs the same functions as the request reception unit 41, the terminal management unit 42, the radio wave measurement unit 43, and the data transmission unit 44. As a result, the radio wave measurement server 30 is capable of performing a process of performing the same function as the request reception unit 41, the terminal management unit 42, the radio wave measurement unit 43, and the data transmission unit 44. A program described in another example is not limited to a program which is executed by the radio wave measurement server 30. For example, it is possible to apply the embodiments in the same manner to a case where the program is executed by another computer or another server or a case where the program is executed in such a way that another computer and another server cooperate.

It is possible to distribute the program through a network such as the Internet. The program is recorded in a computer-readable recording medium, such as a hard disk, a flexible disk (FD), a CD-ROM, a MO, and a DVD, and may be executed by being read from the recording medium by a computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio wave management method executed by a processor included in a radio wave management apparatus, the radio wave management method comprising:
counting the number of first mobile terminals which exist in a first area corresponding to a measurement target of a radio wave situation;
requesting second mobile terminals, which exist in a second area that is different from the first area, to move to the first area when the number of first mobile terminals is smaller than the predetermined number;
requesting the first mobile terminals and the second mobile terminals to measure the radio wave situation when the second mobile terminals move to the first area;
receiving the radio wave situation from the first mobile terminals and the second mobile terminals; and
transmitting the received radio wave situation to a computer in response to a request from the computer which is coupled to the radio wave management apparatus.

2. The radio wave management method according to claim 1, further comprising:
requesting the first mobile terminals to measure the radio wave situation when the number of first mobile terminals is equal to or larger than an predetermined number; and
receiving the radio wave situation from the first mobile terminals.

3. The radio wave management method according to claim 1, further comprising:
selecting an area, which is adjacent to the first area or which includes the first area, as the second area when the number of first mobile terminals is smaller than the predetermined number,
wherein the requesting to move to the first area includes requesting for the second mobile terminals which exist in the second area and outside the first area.

4. The radio wave management method according to claim 3,
wherein the selecting includes selecting, as the second area, an area which is acquired by extending respective vertexes of the first area according to a difference between the predetermined number and the number of first mobile terminals which exist in the first area.

5. The radio wave management method according to claim 3,
wherein the selecting includes selecting an area, which is acquired by reducing the extended area, as the second area according to a density of the number of first mobile terminals in the first area.

6. The radio wave management method according to claim 3,
wherein the selecting includes selecting the second area in a plurality of candidate areas, which exist in a vicinity of the first area, based on at least any one of a distance from the first area and the number of mobile terminals which exist in the plurality of candidate areas.

7. The radio wave management method according to claim 1, further comprising:
counting the number of first mobile terminals, which exist in the first area, after prescribed time elapses after requesting to move to the first area;
requesting the first mobile terminals, which exist in the first area, to measure the radio wave situation after the prescribed time elapses when the number of first mobile terminals is equal to or larger than the predetermined number; and
transmitting a request to the second mobile terminals, which exist in the second area, to move to the first area when the number of first mobile terminals, which exist in the first area, is smaller than the predetermined number after the prescribed time elapses.

8. The radio wave management method according to claim 1, wherein the computer executes a radio wave improvement process in the first area based on the received radio wave situation.

9. A radio wave management apparatus comprising:
a memory; and
a processor coupled to the memory and configured to:
   count the number of first mobile terminals which exist in a first area corresponding to a measurement target of a radio wave situation,
   request second mobile terminals, which exist in a second area that is different from the first area, to move to the first area when the number of first mobile terminals is smaller than the predetermined number,
   request the first mobile terminals and the second mobile terminals to measure the radio wave situation when the second mobile terminals move to the first area,
   receive the radio wave situation from the first mobile terminals and the second mobile terminals, and
   transmit the received radio wave situation to a computer in response to a request from the computer which is coupled to the radio wave management apparatus.

10. The radio wave management apparatus according to claim 9, wherein the processor is configured to:
   request the first mobile terminals to measure the radio wave situation when the number of first mobile terminals is equal to or larger than an predetermined number, and
   receive the radio wave situation from the first mobile terminals.

11. The radio wave management apparatus according to claim 9,
   wherein the computer executes a radio wave improvement process in the first area based on the received radio wave situation.

12. A non-transitory computer-readable recording medium storing a program that causes a processor included in a radio wave management apparatus to perform a process, the process comprising:
   counting the number of first mobile terminals which exist in a first area corresponding to a measurement target of a radio wave situation;
   requesting the first mobile terminals to measure the radio wave situation when the number of first mobile terminals is equal to or larger than an predetermined number;
   receiving the radio wave situation from the first mobile terminals;
   requesting second mobile terminals, which exist in a second area that is different from the first area, to move to the first area when the number of first mobile terminals is smaller than the predetermined number;
   requesting the first mobile terminals and the second mobile terminals to measure the radio wave situation when the second mobile terminals move to the first area;
   receiving the radio wave situation from the first mobile terminals and the second mobile terminals; and
   transmitting the received radio wave situation to a computer in response to a request from the computer which is coupled to the radio wave management apparatus.

13. The recording medium according to claim 12, wherein the process further comprising:
   requesting the first mobile terminals to measure the radio wave situation when the number of first mobile terminals is equal to or larger than an predetermined number; and
   receiving the radio wave situation from the first mobile terminals.

14. The recording medium according to claim 12,
   wherein the computer executes a radio wave improvement process in the first area based on the received radio wave situation.

* * * * *